United States Patent
Dorr et al.

(10) Patent No.: US 10,178,184 B2
(45) Date of Patent: Jan. 8, 2019

(54) SYSTEM AND METHOD FOR SESSION HANDLING IN A MULTITENANT APPLICATION SERVER ENVIRONMENT

(71) Applicant: ORACLE INTERNATIONAL CORPORATION, Redwood Shores, CA (US)

(72) Inventors: Joshua Dorr, San Jose, CA (US); Steven Liu, Beijing (CN); Lenny Phan, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 110 days.

(21) Appl. No.: 15/204,351

(22) Filed: Jul. 7, 2016

(65) Prior Publication Data
US 2017/0019485 A1 Jan. 19, 2017

Related U.S. Application Data

(60) Provisional application No. 62/191,798, filed on Jul. 13, 2015.

(51) Int. Cl.
H04L 29/08 (2006.01)
H04L 29/14 (2006.01)

(52) U.S. Cl.
CPC ........... *H04L 67/142* (2013.01); *H04L 67/10* (2013.01); *H04L 67/1027* (2013.01);
(Continued)

(58) Field of Classification Search
CPC ... H04L 67/142; H04L 67/10; H04L 67/1027; H04L 67/146; H04L 67/147; H04L 69/40
(Continued)

(56) References Cited

U.S. PATENT DOCUMENTS

| 8,326,876 B1 | 12/2012 | Venkataraman et al. |
| 2001/0047276 A1 | 11/2001 | Eisenhart |

(Continued)

FOREIGN PATENT DOCUMENTS

| CN | 101639835 | 2/2010 |
| CN | 102170457 | 8/2011 |

(Continued)

OTHER PUBLICATIONS

Gil, "What's New in WebLogic 12c", Jun. 17, 2014, https://www.slideshare.net/OracleMKTPR20/novedades-de-weblogic-12cdavid-sanz, Oracle, 41 pages.*

(Continued)

*Primary Examiner* — Brian J. Gillis
*Assistant Examiner* — Chhian (Amy) Ling
(74) *Attorney, Agent, or Firm* — Tucker Ellis LLP

(57) ABSTRACT

In accordance with an embodiment, systems and methods for session handling in a multitenant application server environment are provided. The ability to replicate a session is important but equally so is the ability to ensure the session is successfully deserialized on some server in order to serve the request. After a server has been shut down, the front end can fail over the request to one of the remaining server members in a cluster. Once the server receives the request it can attempt to grab the session from a server that holds a copy of that session. When a patched or unpatched server attempts to load the session that originated from a server of the opposite state, it can fail to deserialize the session, and inform the traffic director of severs in the cluster that are capable of deserializing the session.

20 Claims, 19 Drawing Sheets

(52) U.S. Cl.
CPC .......... *H04L 67/146* (2013.01); *H04L 67/147* (2013.01); *H04L 69/40* (2013.01)

(58) Field of Classification Search
USPC ........................................................ 709/228
See application file for complete search history.

(56) References Cited

U.S. PATENT DOCUMENTS

| | | | |
|---|---|---|---|
| 2009/0259999 | A1 | 10/2009 | Srinivasan |
| 2011/0138374 | A1 | 6/2011 | Pal |
| 2011/0161949 | A1 | 6/2011 | Kodaka |
| 2011/0213870 | A1 | 9/2011 | Cai et al. |
| 2011/0321031 | A1* | 12/2011 | Dournov .................. G06F 8/65 717/171 |
| 2012/0054732 | A1 | 3/2012 | Jain et al. |
| 2012/0072597 | A1 | 3/2012 | Teather et al. |
| 2012/0102480 | A1* | 4/2012 | Hopmann ............... G06F 8/656 717/172 |
| 2012/0227116 | A1* | 9/2012 | Huang .................. G06F 17/243 726/30 |
| 2013/0031403 | A1* | 1/2013 | Mordani ................. H04L 67/28 714/4.11 |
| 2013/0262689 | A1 | 10/2013 | Schmidt et al. |
| 2013/0268920 | A1* | 10/2013 | Ursal ........................ G06F 8/70 717/131 |
| 2013/0275819 | A1* | 10/2013 | Banerjee ............. G06F 11/0769 714/57 |

FOREIGN PATENT DOCUMENTS

| | | |
|---|---|---|
| CN | 102333115 | 1/2012 |
| CN | 102571821 | 7/2012 |
| CN | 102609271 | 7/2012 |
| CN | 102932404 | 2/2013 |
| CN | 102932405 | 2/2013 |
| CN | 103455512 | 12/2013 |
| CN | 102571916 | 11/2015 |
| GB | 2510874 | 8/2014 |
| WO | 0078004 | 12/2000 |
| WO | 2011162991 | 12/2011 |
| WO | 2012054160 | 4/2012 |

OTHER PUBLICATIONS

Fielding, et al., "Hypertext Transfer Protocol (HTTP/1.1) : Semantics and Content", Jun. 2014, 101 pages.

"Introducing WebLogic Server 12c", Jan. 2012, Oracle, pp. 1-16, 16 pages.

"Oracle Enterprise Manager Concepts, 11g Release 11.1.0.1", Oracle, Apr. 2010, 260 pages.

United States Patent and Trademark Office, Office Action dated May 21, 2018 for U.S. Appl. No. 15/466,267, 14 Pages.

Chinese Patent Office, Office Action dated Jul. 20, 2016, 8 pages.

* cited by examiner

SYSTEM AND METHOD FOR SESSION HANDLING IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR SESSION HANDLING IN A MULTITENANT APPLICATION SERVER ENVIRONMENT", Application No. 62/191,798, filed Jul. 13, 2015; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; and is related to U.S. Patent Application titled "SYSTEM AND METHOD FOR SUPPORTING PATCHING IN A MULTITENANT APPLICATION SERVER ENVIRONMENT", application Ser. No. 14/864,695, filed Sep. 24, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud platform environments, and are particularly related to a system and method for session handling in a multitenant application server environment.

BACKGROUND

In application server and other enterprise computing environments, a common task for an administrator is the need to patch a series of application server installations supporting multiple domains. During this patching process, it is important to protect against session loss.

SUMMARY

In accordance with an embodiment, systems and methods for session handling in a multitenant application server environment are provided. The ability to replicate a session is important but equally so is the ability to ensure the session is successfully deserialized on some server in order to serve the request. After a server has been shut down, the front end can fail over the request to one of the remaining server members in a cluster. Once the server receives the request it can attempt to grab the session from a server that holds a copy of that session. When a patched or unpatched server attempts to load the session that originated from a server of the opposite state, it can fail to deserialize the session, and inform the traffic director of severs in the cluster that are capable of deserializing the session.

DETAILED DESCRIPTION

In accordance with an embodiment, described herein is a system and method for supporting patching in a multi-tenant application server environment. The system can associate one or more partitions with a tenant, for use by that tenant, wherein a partition is a runtime and administrative subdivision or slice of a domain. A patching process can take advantage of high-availability features provided by an application server clustering environment, to apply patches in a controlled, rolling restart, which maintains a domain's ability to operate without interruption, or with zero downtime. The process can be used to automate complex or long running tasks, including preserving an unpatched or prior version of an application server, application, or other software component for possible rollback, or providing automatic reversion in the event of an unrecoverable error.

Application Server (e.g., Multi-Tenant, MT) Environment

Figure 1:
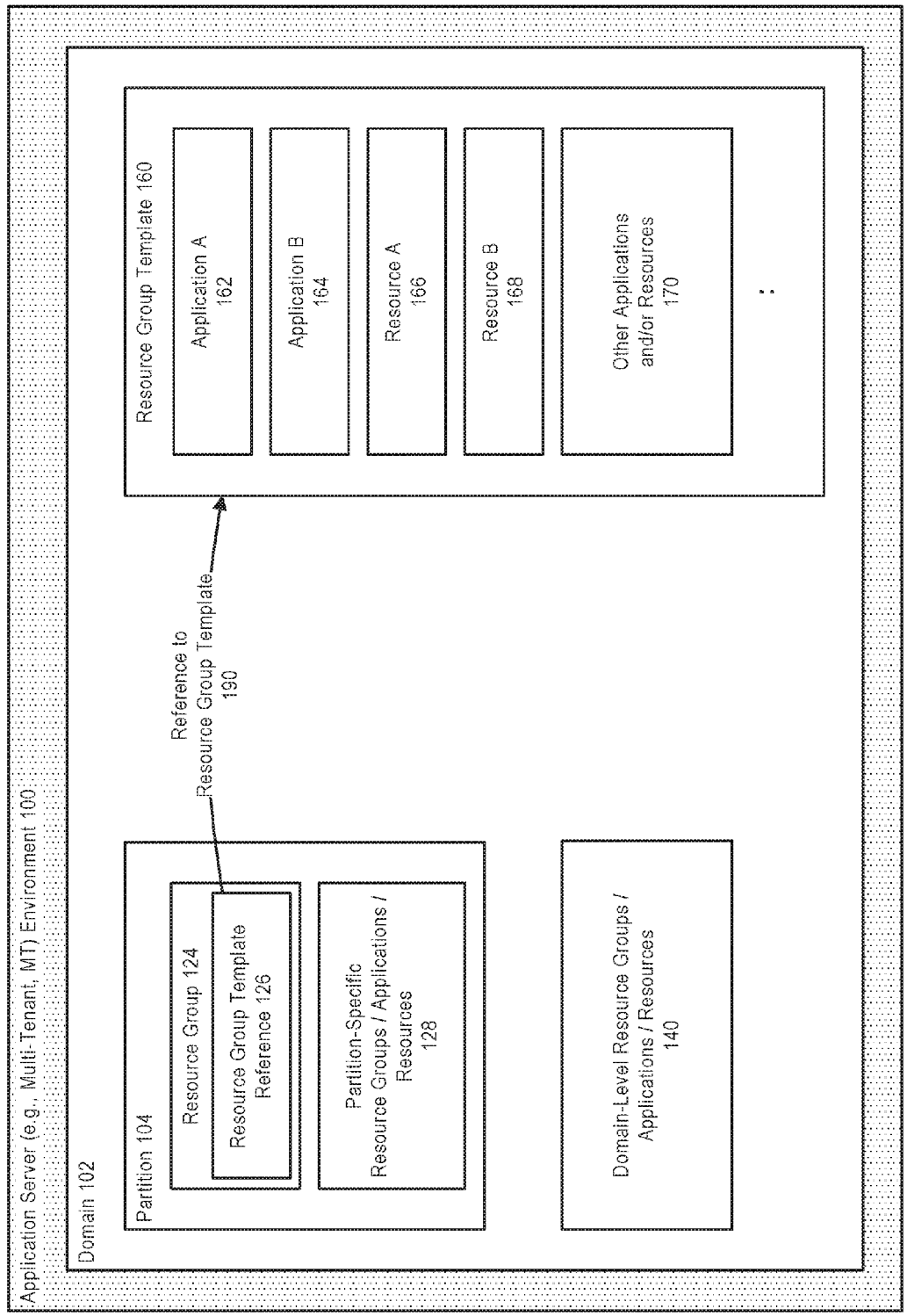
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
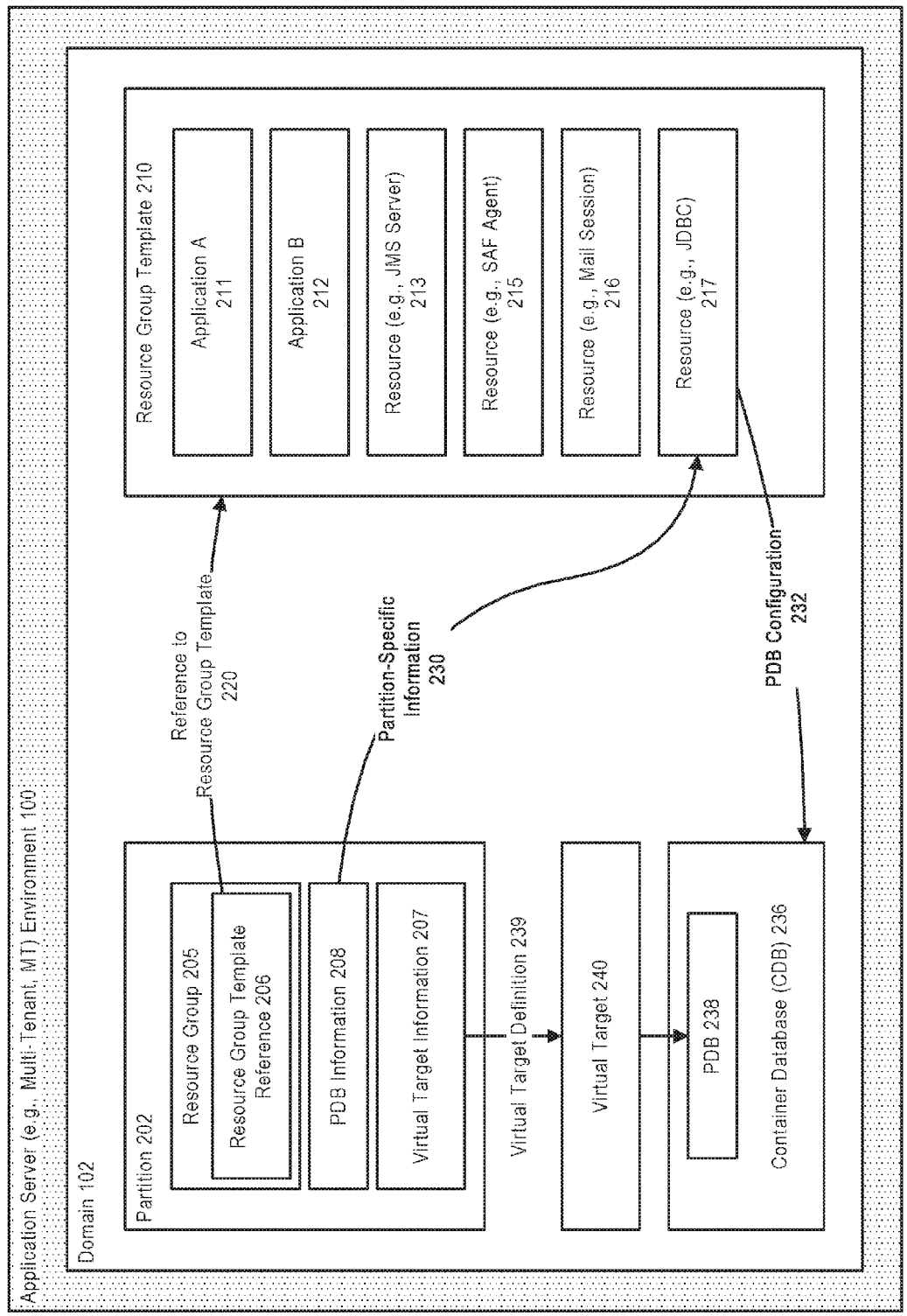
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
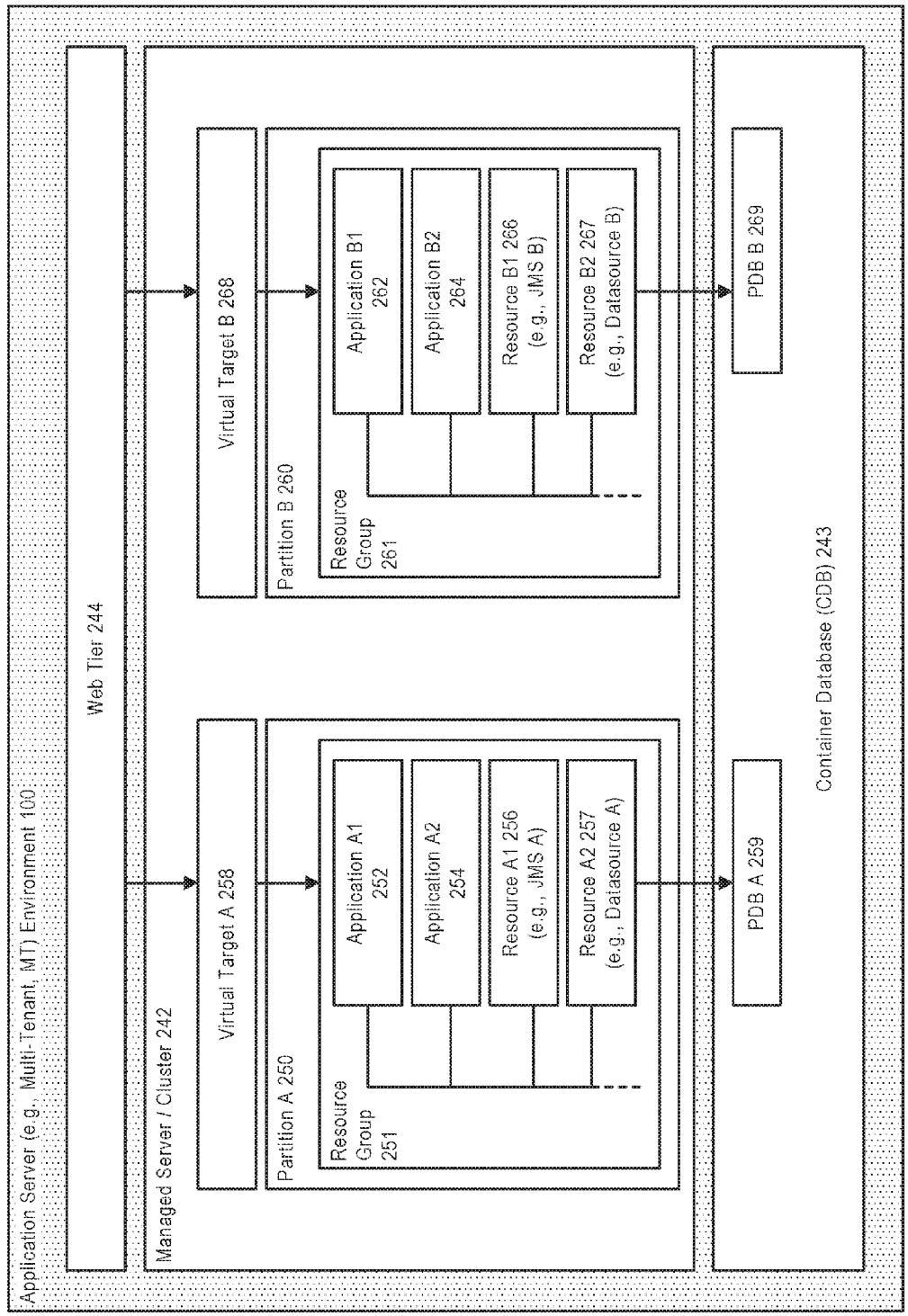
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
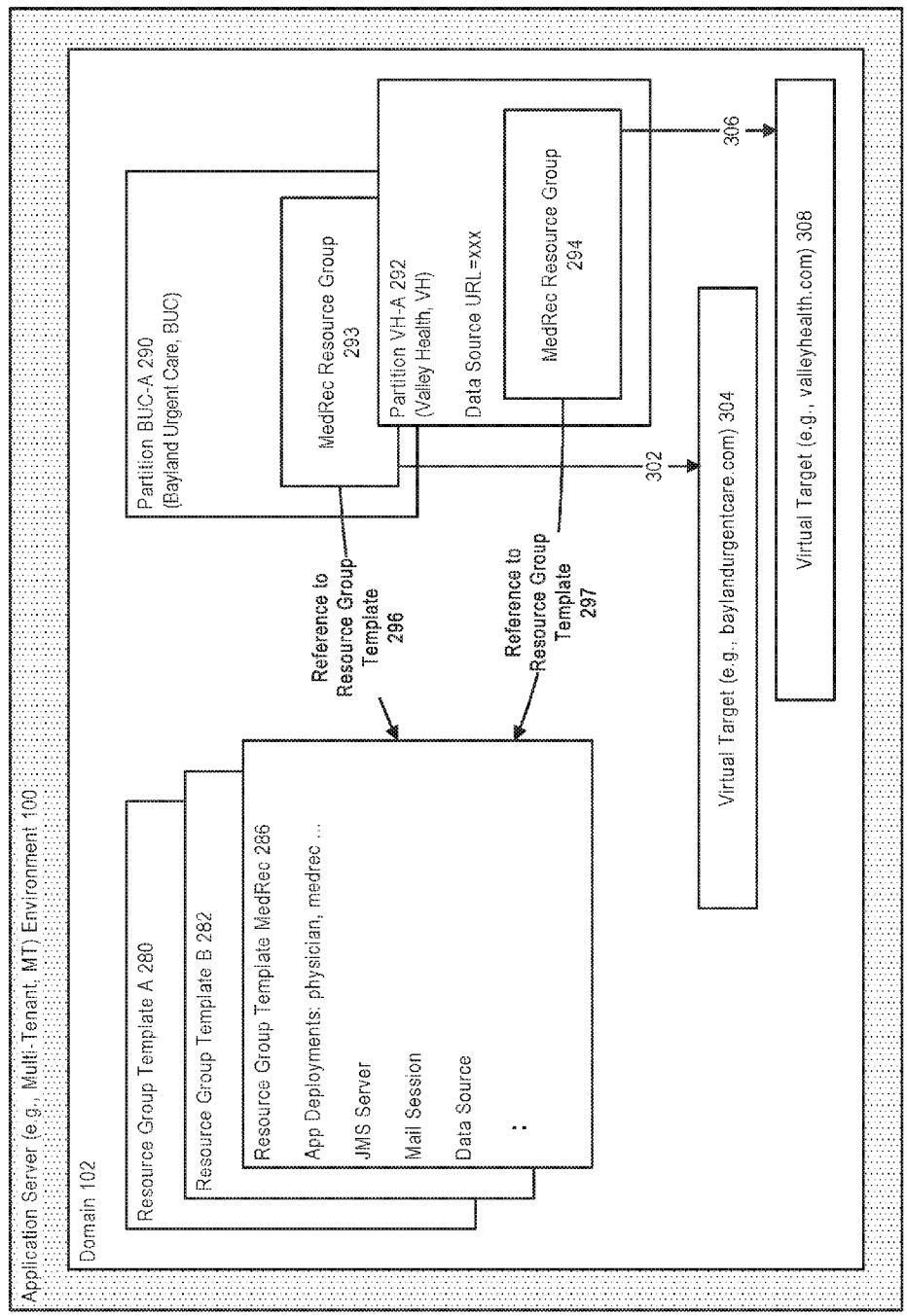
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
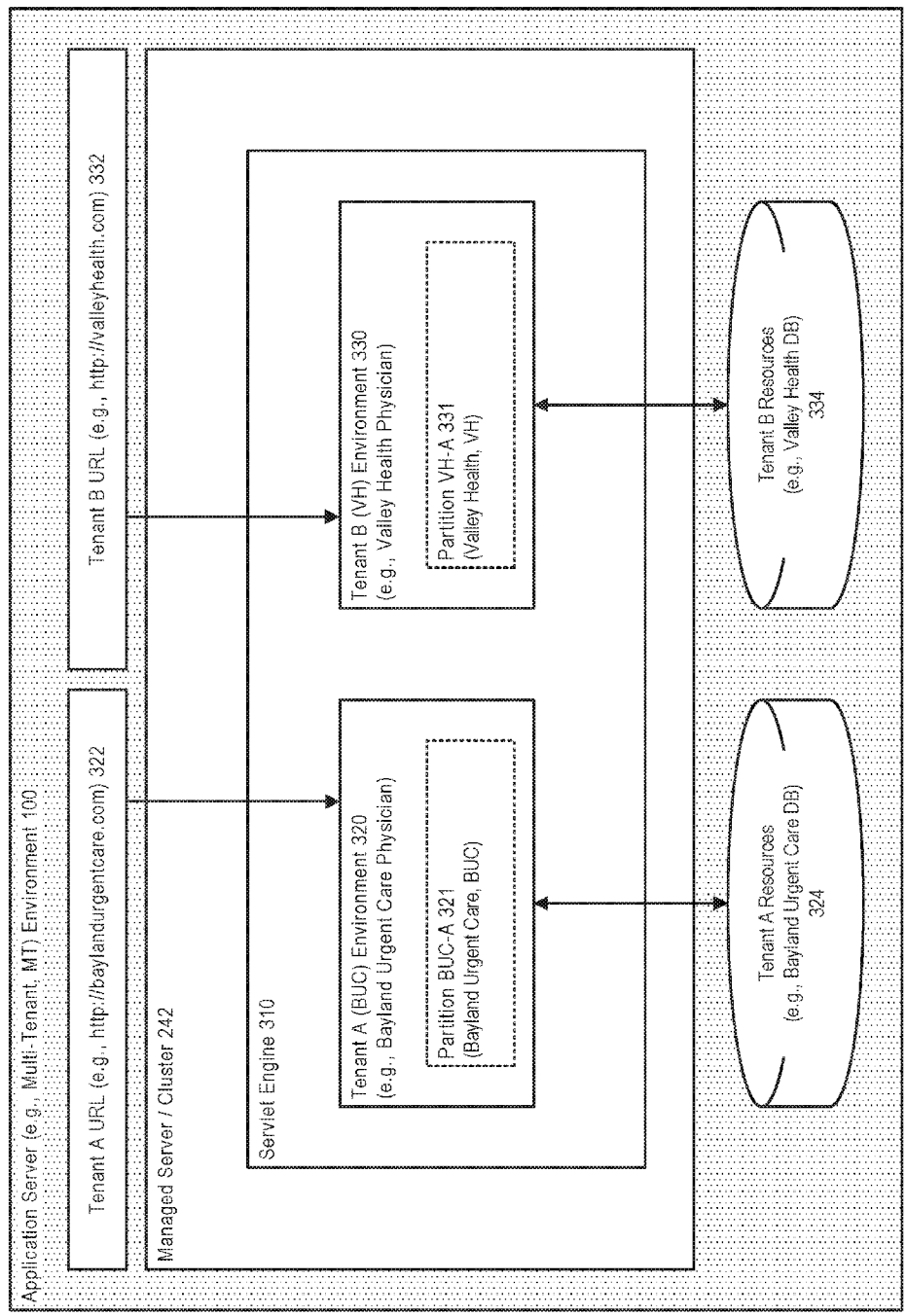
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Multitenant-Aware Patching

In accordance with an embodiment, described herein is a system and method for session handling during patching in a multi-tenant application server environment.

In accordance with various embodiments, the description of the patching process provided herein uses some or all of the following concepts: PSU: patch set update, ZDT: zero downtime, Workflow: a sequence of tasks executed by the orchestration framework or patch orchestrator, Patching primitive: a logical operation representing a reusable portion of the patching rollout, and Out of place patching: the patching of an, e.g., Oracle Home that is running on a nonproduction server, then testing and verifying the patches before pushing it out to production server, in an out of band patching and testing manner that requires less downtime of the production servers and provides the ability to more easily rollback the original version if needed.

Figure 6:
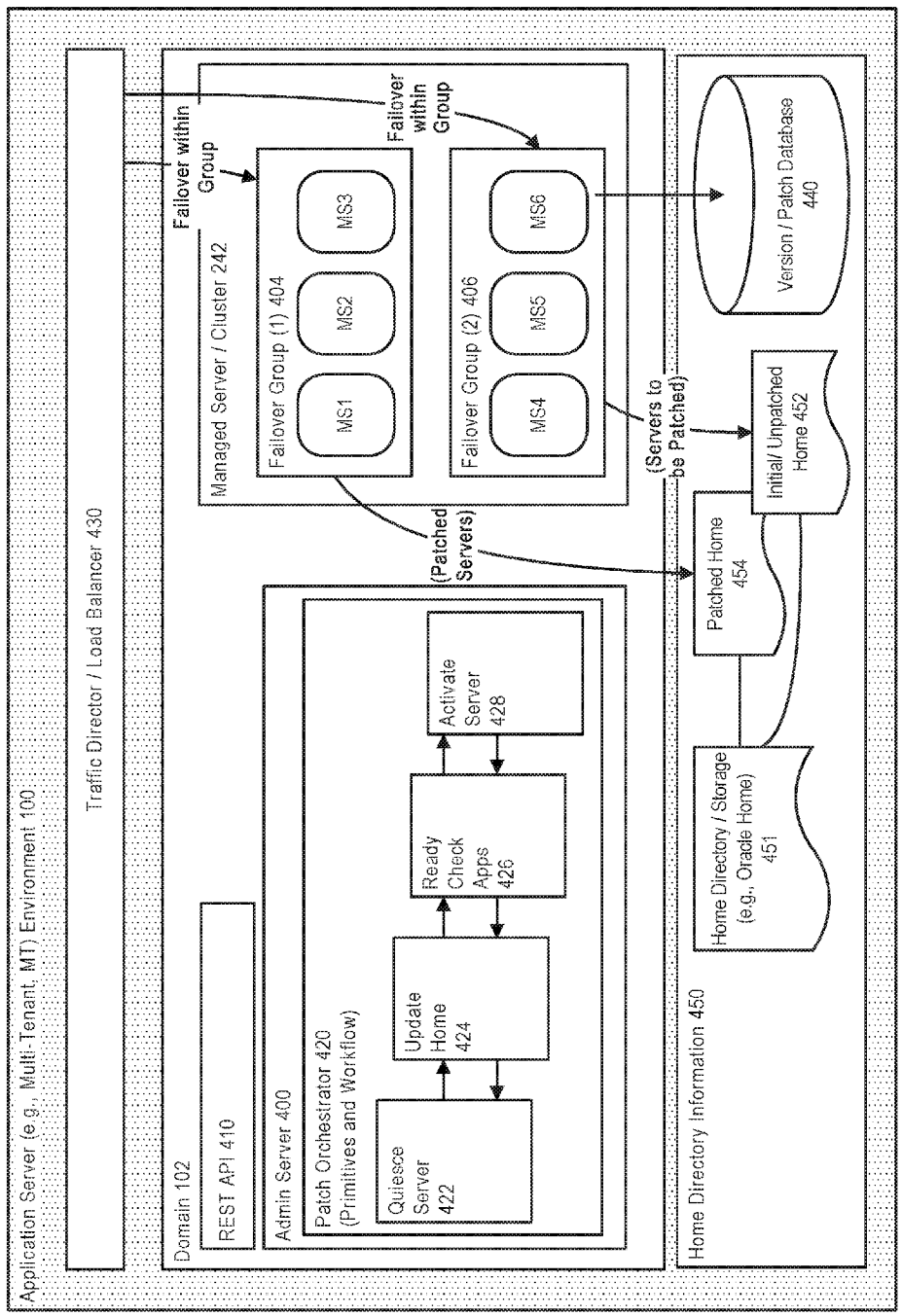
FIG. 6 illustrates support for patching, in accordance with an embodiment.

FIG. 6 illustrates support for patching, in accordance with an embodiment.

As illustrated in FIG. 6, in accordance with an embodiment, the system can include an administration server (admin server) 400, which is responsible for administering a managed server or cluster, including in this example a first failover group 404 of managed servers (here indicated as MS1, MS2 and MS3), and a second failover group of managed servers (here indicated as MS4, MS5 and MS6). The administration server can be accessed by clients via a REST API 410, or another type of interface.

In accordance with an embodiment, the system also includes a patch orchestration framework or patch orchestrator 420, which operates to roll out and/or apply different versions of software components or patches, using a plurality of patching primitives as further described below, as part of a patching workflow.

Generally, the patch orchestrator is designed to operate in a robust manner, and to include support for functionality such as task retry, and rollback semantics.

In accordance with an embodiment, the patch orchestration process leverages a variety of features provided by an application server, to provide advanced functionalities, such as the ability to handle application sessions that may not be backward-compatible; session-aware graceful shutdown which waits for existing sessions in a managed server to finish before shutting down that server; lazy de-serialization of replicated sessions, which turns off automatic de-serialization of replicated sessions during a patching window; dynamic turn on/off of lazy de-serialization to avoid cluster restarts; and failover based on group information, each of which feature or functionalities are further described below.

In accordance with an embodiment, examples of patching primitives that are supported by the patch orchestrator can include Quiesce Server 422, which communicates with a traffic director or other type of load balancer 430, for example an Oracle Traffic Director (OTD), to quiesce traffic to a specified server; Update Home 424, which changes a home directory or other storage's (e.g., Oracle Home) symbolic link (symlink) to point to a new target; Ready Check Apps 426, which communicates with a ready app or similar framework, and completes only when all registered applications are in a ready state; and Activate Server 428, which communicates with, e.g., OTD, to resume sending traffic to a specified server.

In accordance with an embodiment, the patch orchestrator, together with its primitives and workflow, can be used in combination with a patch database 440, to support different versions of software components or patches, including, for example, the information required to patch or update a set of home directories or other storages 450, for one or more managed servers 451, from an initial patched, or an unpatched version 452, to a subsequently-patched version 454.

For example, as illustrated in FIG. 6, the cluster can include two failover groups of managed servers as described above, in which the first failover group and its selection of the managed servers (MS1, MS2 and MS3) use a patched version of the home directory, while a second failover group and the others of the managed servers (MS4, MS5 and MS6) use an initial, or unpatched, version of the home directory.

A request from the traffic director or load balancer can failover to any server within the failover group. As further described below, in accordance with an embodiment, a lazy session deserialization functionality can be used to gracefully handle failover of any sessions that may span the two failover groups, and the managed servers therein.

Figure 7:
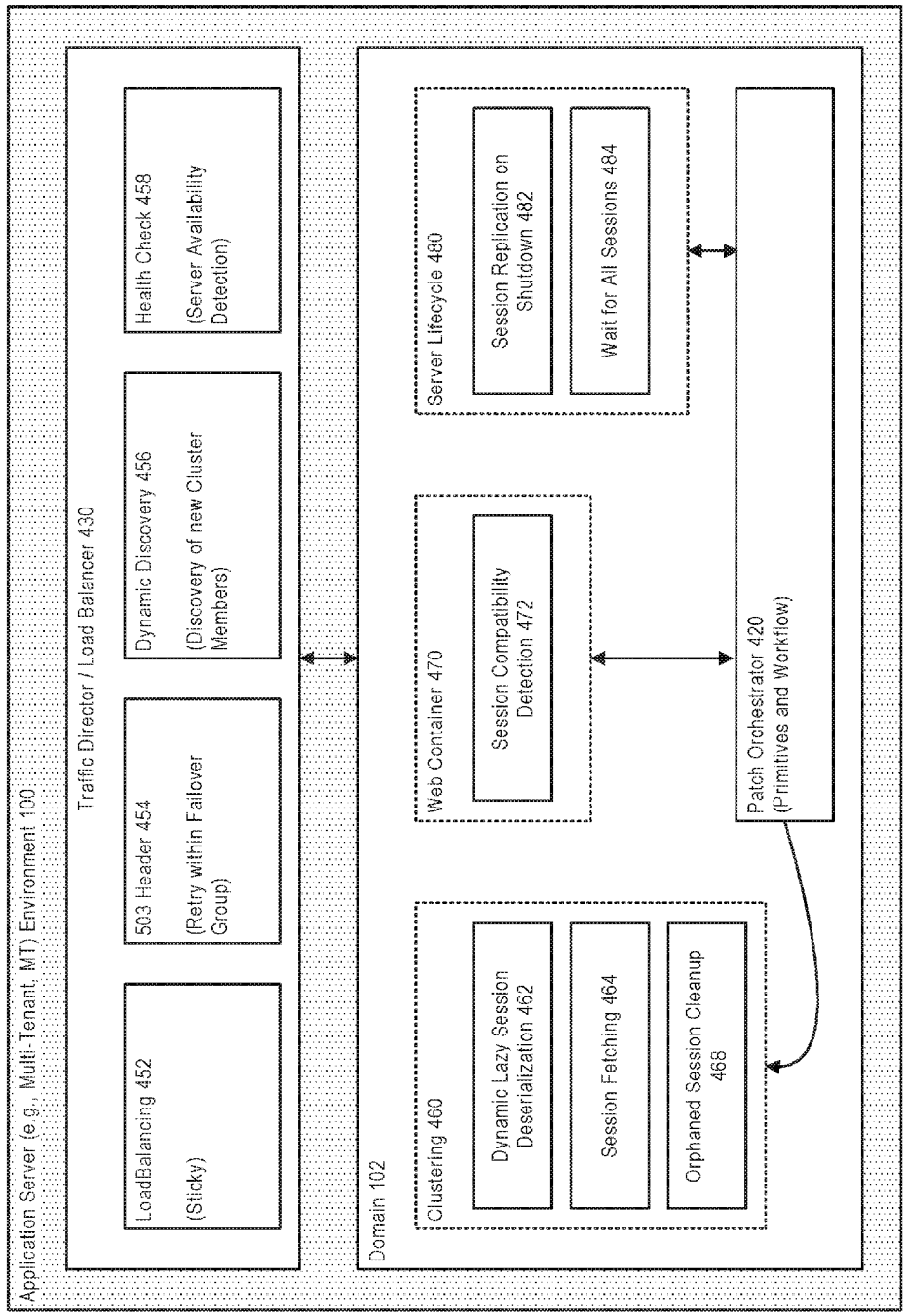
FIG. 7 further illustrates a system for patching, including support for session handling in accordance with an embodiment.

FIG. 7 further illustrates a system for patching, including support for session handling in accordance with an embodiment.

In a typical application server environment, the shutting down and subsequent restarting of a server instance may take some time, perhaps even several minutes. To address this, in accordance with an embodiment, the system includes a smarter session replication process that can be performed on shutdown, including determining whether active sessions are provided anywhere else within the system, and, if not, then making the sessions available before shutting down the intended server.

As illustrated in FIG. 7, in accordance with an embodiment, the traffic director supports functionalities such as load balancing 452, 503 header detection 454, dynamic discovery 456, and health check 458; while the application server clustering environment 460 supports functionalities such as dynamic lazy session deserialization 462, session fetching 464, and orphaned session cleanup 468; the web container 470 supports functionalities such as session compatibility detection 472; and the server lifecycle component 480 supports functionalities such as session replication on shutdown 482, and wait for all sessions 484.

In accordance with an embodiment, each of the above components are described in further detail below, including their usage to address various circumstances such as: dynamic turning on and off of patching support before and after patching; session fetching; orphaned session cleanup to avoid multiple backups; handling of incompatible sessions, including how one server may send a 503 message to a traffic director to instruct it to try a different server; and handling of multiple versions of an application server, application, or other component.

For example, in accordance with an embodiment, the system allows different versions of an application server, application, or other component to be deployed to different partitions, by creating a new partition and setting up a different version of the application server, application, or other component at the new partition. The traffic director can be configured to control how much of and/or which type of traffic should be directed to the old version of the application server, application, or other component, versus the new version of the application server, application, or other component.

Unlike a production redeployment of an application, where only two versions of the application may be deployed (and wherein one version of the application needs to be marked for retirement), in accordance with an embodiment the system allows more than two versions of an application to be deployed and active at the same time, with the only requirement being that they are deployed to different partitions.

In accordance with an embodiment, the system also supports the ability of multiple tenants to share an underlying logic, maintaining a particular patch level at a cluster level, but, for example, moving some partitions to various clusters as necessary if it is determined that those partitions cannot support the particular patch level at that particular time.

Similarly, in accordance with an embodiment, the system supports the ability to use a patch level version of an, e.g, Oracle Home at one node for testing purposes, and then roll out that version of the Oracle Home to other nodes as necessary, once testing has been completed.

Figure 8:
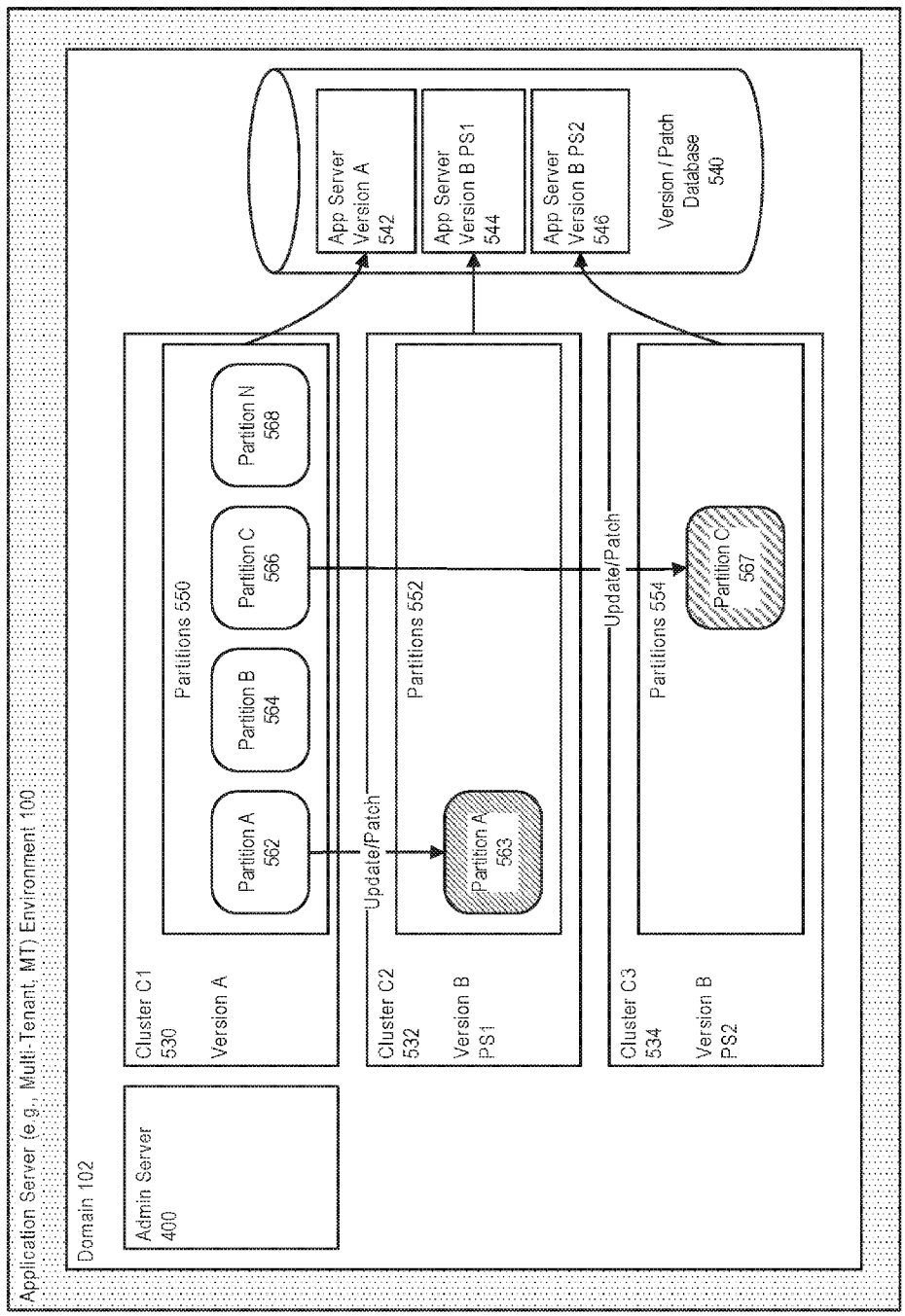
FIG. 8 further illustrates a system for patching, in accordance with an embodiment.

FIG. 8 further illustrates a system for patching, in accordance with an embodiment.

As illustrated in FIG. 8, in accordance with an embodiment, the system allows a cluster within a domain to use a different home directory, for example a different Oracle Home, and therefore operate using a different application server (e.g., WLS) version or patch version. The managed servers for the cluster can either reside on the same, or on different hosts, as any managed servers supporting other clusters from the same domain.

In particular, as illustrated in FIG. 8, the system can include a plurality of clusters, including C1 530, C2 532 and C3 534, each operating one or more partitions 550, 552, 554, here indicated as partition A 562, partition B 564, partition C 566, and partition N 568.

In accordance with an embodiment, a patch database 540 can include version or patch information for a plurality of versions of application server, application, or other component, here indicated as version A 542, version B patch set 1 (PS1) 544, and version B patch set 2 (PS2) 546.

In accordance with an embodiment, different partitions can be migrated and/or patched at different times, so that, for example, the partition A can be migrated from the cluster C1 having a first version A of a particular application server (e.g., WLS), to the cluster C2 having a different version B PS1 of the application server. Similarly, the partition C can be migrated from the cluster C1 having a version A of the application server, to the cluster C3 having yet another different version B PS2 of the application server.

In accordance with an embodiment, some advantages of this patching process include enabling discrete partitions to be migrated to newer (e.g., patched) versions of an application server, application, or other component (e.g., a newer version of WLS), without impacting other partitions sharing the same resources. The patching process also allows A/B testing of, for example, an initial version of a WLS application server versus a patched version of WLS, or the testing of different versions of an application with a particular version of WLS.

In accordance with an embodiment, for a period of time, a partition can be considered as being simultaneously "live" in two clusters (e.g., a source and a target cluster), which allows any existing sessions to complete or to timeout. Once the partition migration is complete, the partition will then be made available only in the target cluster, including any newer (e.g., patched) version of the application server, application, or other component.

Figure 9:
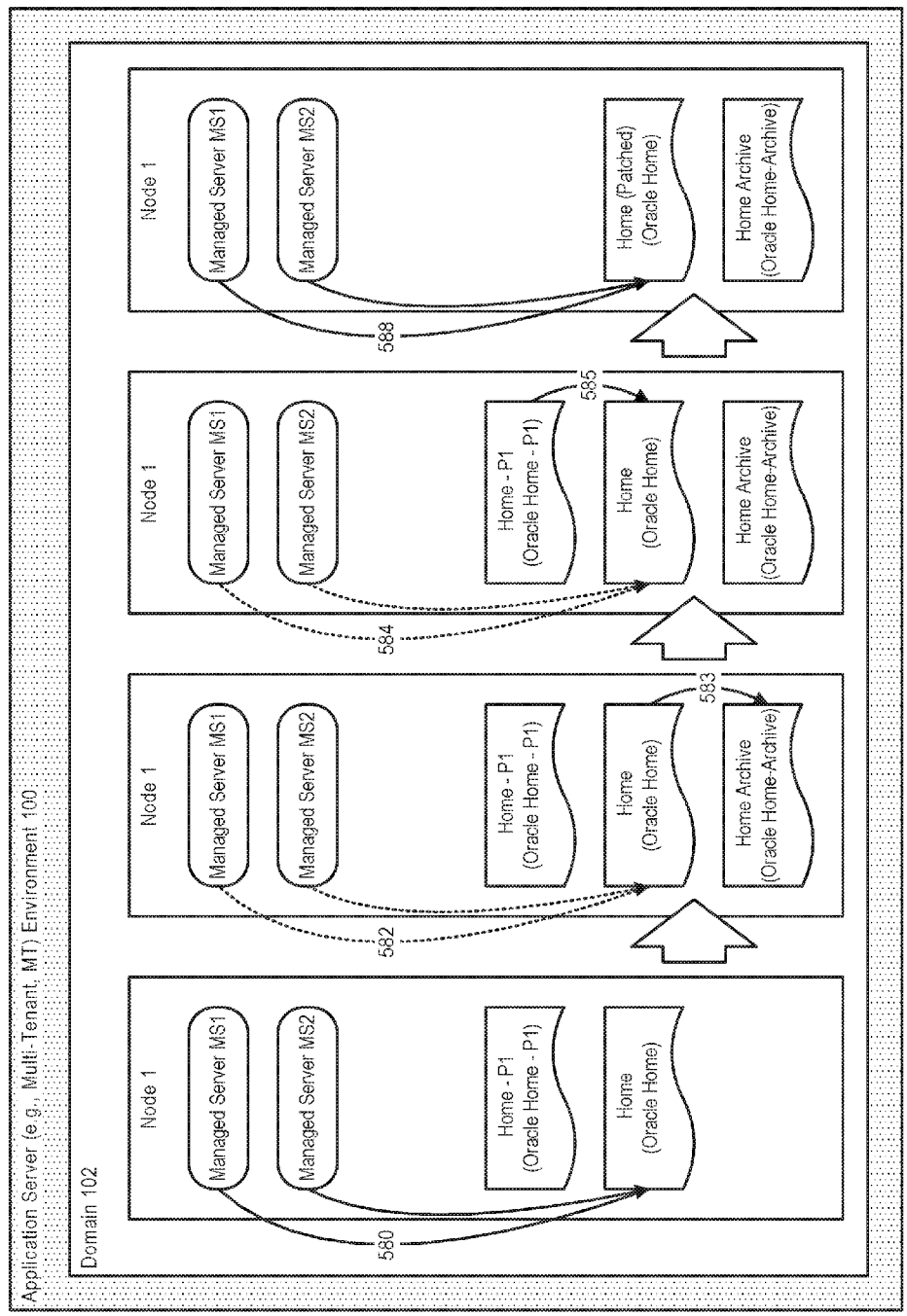
FIG. 9 illustrates a system for patching, in accordance with an embodiment.

FIG. 9 illustrates a system for patching, in accordance with an embodiment.

As illustrated in FIG. 9, in accordance with an embodiment, to patch one or more computer nodes or servers having an application server, application, or other component running thereon, the servers on those nodes are first gracefully shutdown.

At 580, a prepare switch (e.g., prepareSwitchOracleHome) primitive is called at the node or server to be patched, which directs the node manager for that node or server to setup a script that will perform the switching of its home directory (e.g., Oracle Home). This step is used to provide the node manager with the parameters that it requires to perform the operation.

At 582, a call can be made to a restart node manager (e.g., RestartNodeManager) primitive, which causes the node manager at that node to transfer control to a script (e.g., switchOracleHome script), which in turn will move 583 a current home directory (e.g., Oracle Home) to a specified directory path, extract a patched application server, application, or other component image into the original location, and then start the node manager again.

At 584, an assert switch (e.g., AssertSwitchOracleHome) primitive is executed, which will confirm that the switching 585 of the home (e.g., Oracle Home) directories has completed successfully.

At 588, a start server (e.g., StartServers) primitive is called for each node or server, and will not complete until a ready app check (e.g., ReadyAppCheck) returns successfully (if it is configured). This will ensure that all of the patched application server, application, or other components at that node can service requests, before the workflow will shut down any more nodes or servers, and supports limited or no (i.e., zero) downtime.

Figure 10:
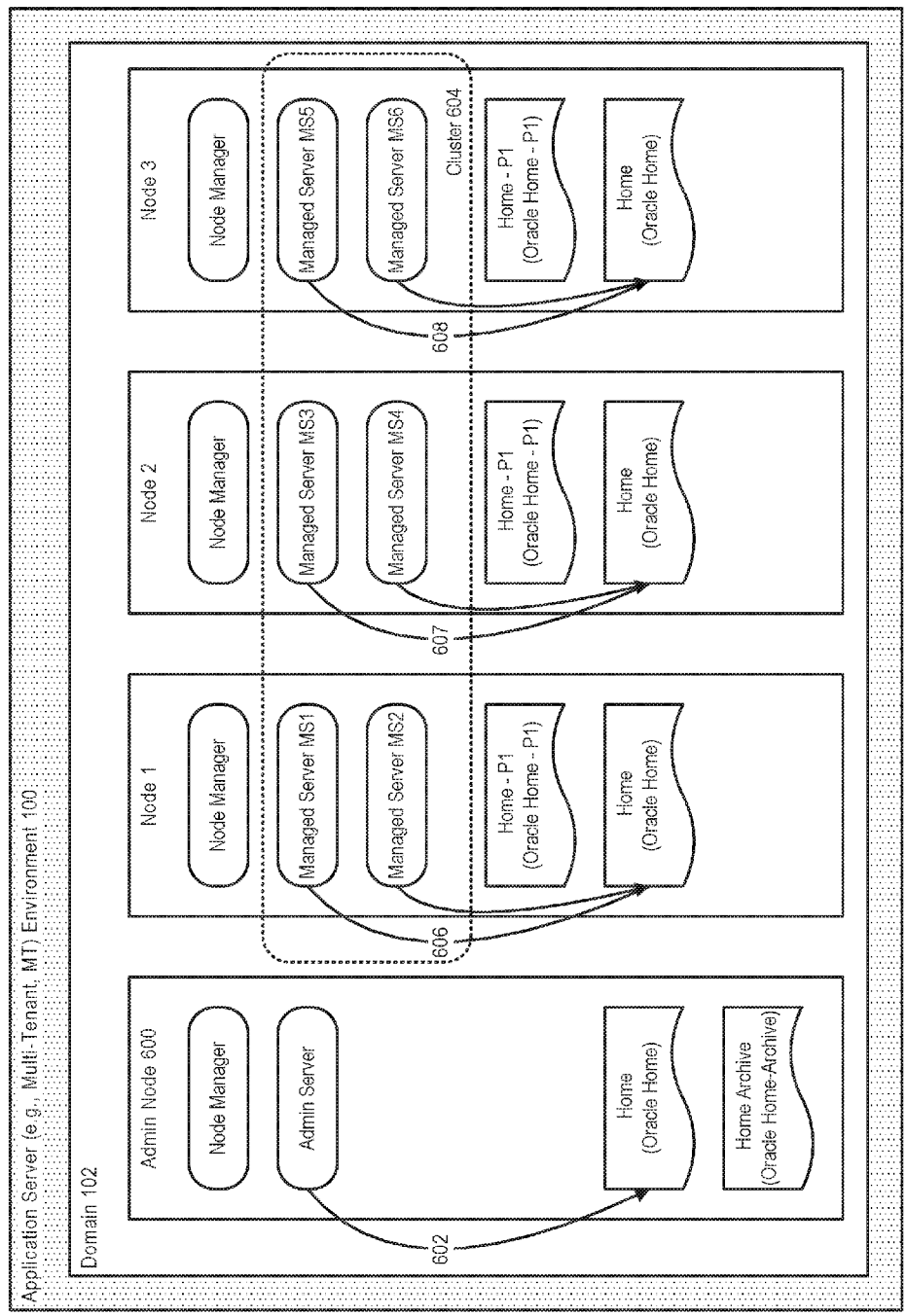
FIG. 10 further illustrates a system for patching, in accordance with an embodiment.
Figure 11:
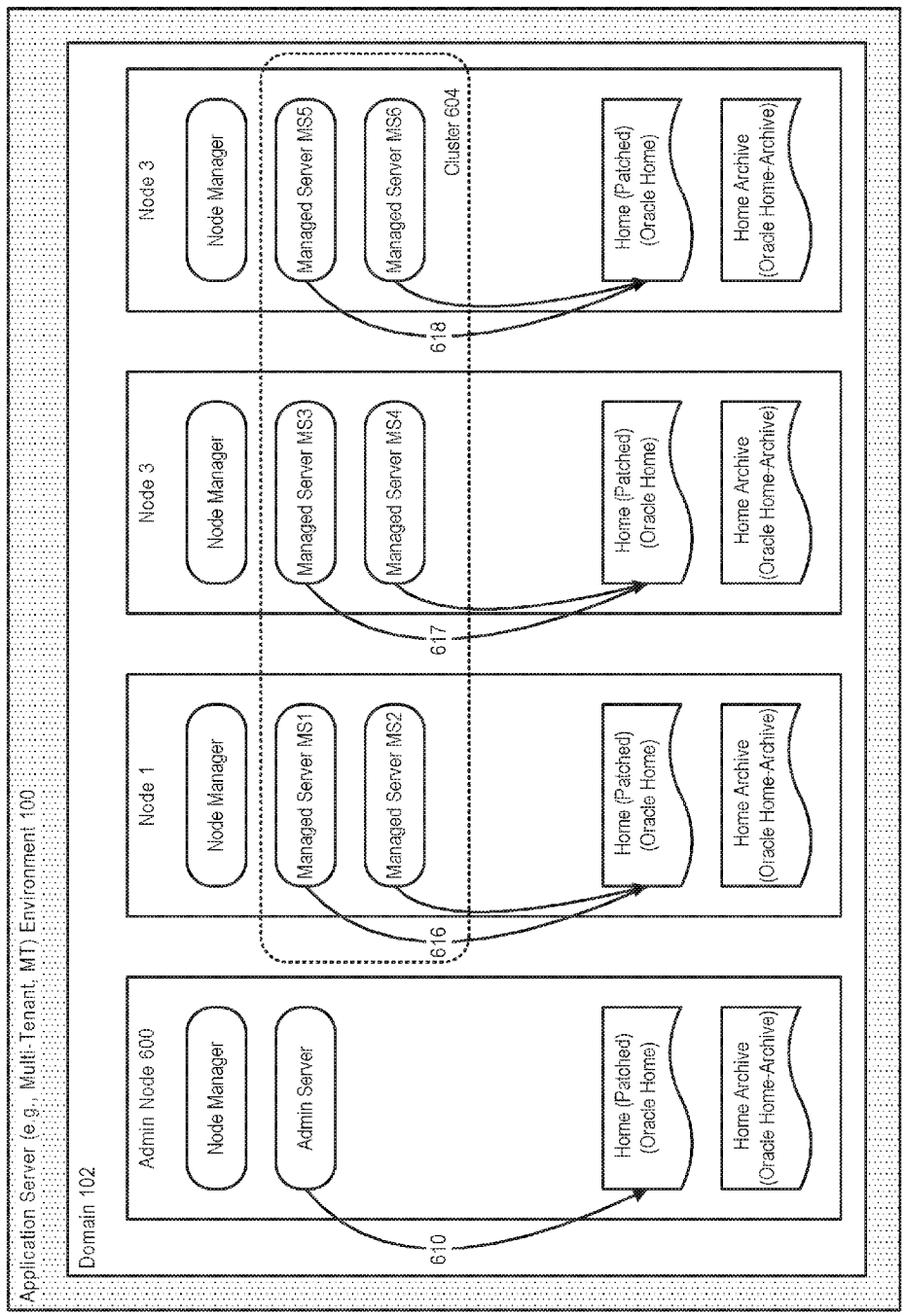
FIG. 11 further illustrates a system for patching, in accordance with an embodiment.

FIGS. 10-11 further illustrate a system for patching, in accordance with an embodiment.

As illustrated in FIGS. 10-11, in accordance with an exemplary embodiment, the system can include a plurality of managed servers in a cluster 604 running across three physical machines or nodes (here indicated as computer nodes 1-3), with an admin server running by itself on its own machine (here indicated as admin node 600). Each pair of managed servers in a cluster on the same machine shares the same local domain directory and the same local home (e.g., Oracle Home) directory. Each machine includes its own node manager.

In accordance with an embodiment, initially the admin server and managed servers use the original home directory 602, 606, 607, 608. The patching process can proceed by copying a patched version to each managed server; and then performing a rollout to the admin server (with no service interruption) 610.

In accordance with an embodiment, the managed servers are sufficiently distributed across enough machines to be able to provide failover of the application server, application, or other component being patched, even while some managed servers are temporarily shut down. The managed servers are then patched, and a rolling restart pointing at patched shared storage 616, 617, 618 is then performed. The process results in no session losses due to state replication, and limited or no (i.e., zero) downtime.

Session Handling—Session Deserialization Issues

During patching, such as zero downtime patching as described above, it is important to protect against session loss in order to truly ensure "zero downtime". This can mean accounting for session replication and fail over during the rolling patching process as well as session compatibility concerns due to application patching. Assuming no server crashes, no user request should be impacted during the entirety of the patching process. This can be achieved through a combination of lazy session deserialization, session fetching, session compatibility detection, session replication on shutdown, and orphaned session cleanup.

In a typical application server (e.g., WLS) environment, the system generally tries to ensure that a session will be available somewhere in the cluster as long as only a single member of the cluster goes down during the time between user requests. If the primary server crashes and then the secondary server crashes, the session would be lost. Session replication distribution is not even throughout the cluster, since all sessions from a primary server are replicated to a single secondary server. However, request failover is evenly distributed. This means that as a group of requests are failing over to another server an even portion will land on the secondary server, and each of the remaining servers across the cluster. Each server will then be responsible for that portion of requests that have been received. Servers that did not have a copy of the session will have to fetch the session and then will use their own secondary selection algorithm to decide where to keep a backup copy. The old, or orphaned, copy is left in place until it is timed out. The end result is that the even distribution of requests will ensure that the sessions in memory are also somewhat evenly distributed, even though the replication algorithm is not.

Asynchronous Replication has distinct windows where the request has completed but the session changes have not been replicated. This window of time also means that there can be stale sessions served whenever the request either fails over due to server crash or is routed incorrectly from the front end. In accordance with an embodiment, the algorithm for finding a session object for a particular session id is: 1. Check the local maps for the session ROID and use it when found. 2. Check the JVMIDs in the client cookie to try getting the session from the primary server or the secondary server. 3. When available, get the session from that server, become the primary and replicate to our preferred secondary server. 4. The session from the original primary/secondary will become orphaned and will only be cleaned up on invalidation or timeout. 5. If the session is not available from above, then return a new session This means that there is the possibility for using a local copy of a session, although the cookie may point to a valid primary or secondary server. This would happen when a failover occurs and a server other than the secondary serves the request. The original secondary has a stale copy and if another fail over occurs to that server then the stale copy will be found and used before any other copy.

The secondary selection for each server will either attempt to choose a secondary automatically or based on the configured values of preferred candidate servers, remote candidate servers, and local candidate servers. Without extra configuration the automatic selection will select a server from another machine based on a modulo operation of the index of the current server in the full server list and the size of the remote server list. When each machine contains a single server and each machine is organized in similar order to the servers this results in each server replicating to the next in the list, server1 to server2, server2 to server3, server3 to server4 and so on until the last server in the list replicates to server1. When a front end server cannot maintain affinity to the primary server due to shutdown, it will randomly redirect the requests in even distribution among the remaining clustered servers.

In accordance with an embodiment, during a patching, such as zero downtime patching, it is possible to roll out a patch that contains upper layer applications or even roll out specific application patches independently. When those applications contain changes, there is a possibility of session incompatibility. For example, session incompatibility can arise with the use of application frameworks. Updating an application with a new version of such a framework can result in a lack of control over the classes contained in the classpath. One patched version of the application session may contain class "patched.Foo" in the session whereas the previous version of the application session may contain class "unpatched.Bar".

In accordance with an embodiment, when a request triggers an attempt to replicate the session, serialization can occur on a patched or unpatched server while the attempt to deserialize could occur on a server of the opposite state. Lacking the appropriate classes in the classpath, the server receiving the session would fail the deserialization process. This would result in the session not being replicated and a warning message printed in the log file. With the session only existing on a single server, it would be at risk of being lost to server shutdown or server crash.

Session Handling—Session Compatibility Issues

In accordance with an embodiment, when patching applications, the ability to replicate the session is important but equally so is the ability to ensure the session is successfully deserialized on some server in order to serve the request. After a server has been shut down, the front end can fail over the request at random to one of the remaining members in the cluster in an even distribution. Once the server receives the request it will attempt to grab the session from a server that holds a copy of that session. When a patched or unpatched server attempts to load the session that originated from a server of the opposite state, an incompatible session would result in a deserialization error and the user would lose their session information.

Figure 12:
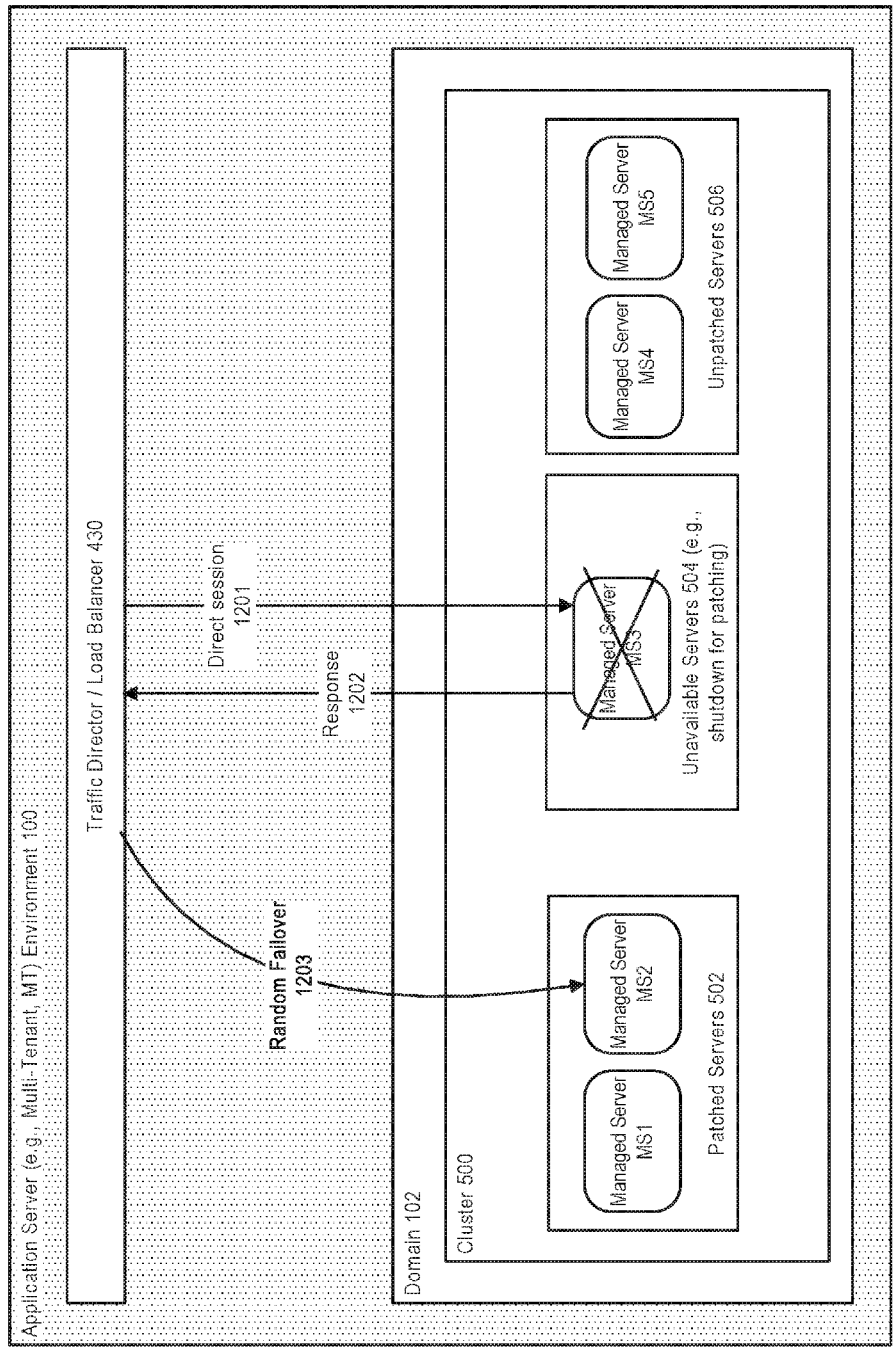
FIG. 12 illustrates a system for session handling, in accordance with an embodiment.

FIG. 12 illustrates a system for session handling, in accordance with an embodiment. More specifically, FIG. 12 depicts a system for session handling during a patch rollout process.

As illustrated in FIG. 12, in accordance with an embodiment and the example illustrated therein, a cluster 500 can include a plurality of managed servers (here indicated as MS1-MS5), provided in a plurality of groups including groups of patched servers 502, unavailable servers 504 (e.g., those severs which are currently being patched), and unpatched servers 506.

In accordance with an embodiment, such as that illustrated in FIG. 12, a patch rollout process can lead to issues with session handling. In accordance with an embodiment, a request for a session can be directed 1201 by the traffic director/load balancer 430 to land on managed server 3, which can be the primary managed server for that session. In such an embodiment, the session is an unpatched session, meaning that it can be loaded without issue onto an unpatched server. However, if an unpatched session is directed to a server that has already been patched, the session may not load as it could be reliant upon classes not present in the patched sever.

In accordance with an embodiment, after MS3 receives the request to load the session from the traffic director 430, it can load the session and send a response 1202 to the traffic director 430. At this point, the cluster 500 may be going through a patching process, whereby MS1 and MS2 have already been patched (e.g., "patched servers 502"), and MS4 and MS5 are unpatched (e.g., "unpatched servers 506"). After sending the response 1202 to the traffic director, MS3 can be taken offline for patching, thus making it an unavailable server 504.

In accordance with an embodiment, the traffic director can then randomly fail over the session to an available server, such as MS2. However, because the requested session is an unpatched session, the session can encounter issues when it is attempted to be loaded on MS2 as MS2 is a patched server and does not necessarily contain all the classes that the requested session relies on, thus potentially resulting in errors.

Figure 13:
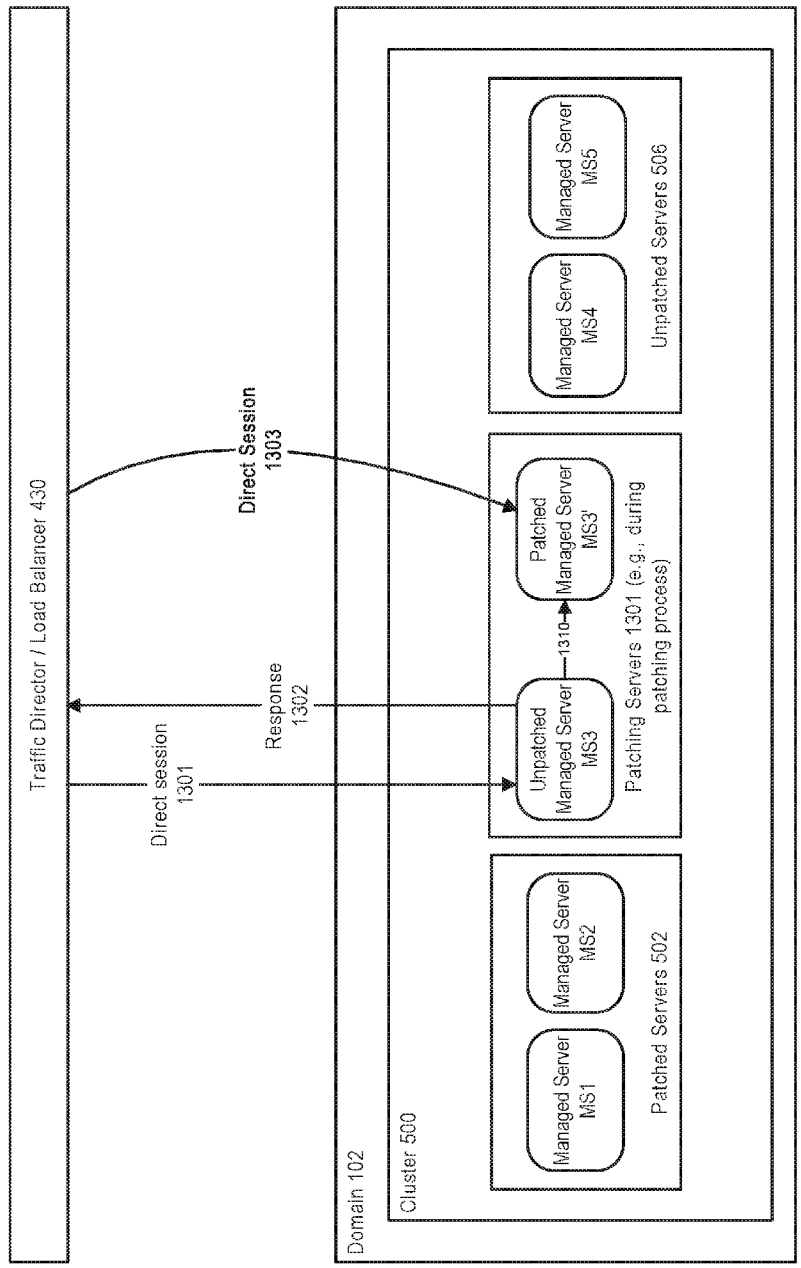
FIG. 13 illustrates a system for session handling, in accordance with an embodiment.

FIG. 13 illustrates a system for session handling, in accordance with an embodiment. More specifically, FIG. 13 depicts a system for session handling during a patch rollout process.

As illustrated in FIG. 13, in accordance with an embodiment and the example illustrated therein, a cluster 500 can include a plurality of managed servers (here indicated as MS1-MS5), provided in a plurality of groups including groups of patched servers 502, servers going through a patching process 1301 (e.g., those severs which are currently being patched), and unpatched servers 506.

In accordance with an embodiment, such as that illustrated in FIG. 13, a patch rollout process can lead to issues with session handling. In accordance with an embodiment, a request for a session can be directed 1301 by the traffic director/load balancer 430 to land on managed server 3, which can be the primary managed server for that session. In such an embodiment, the session is an unpatched session, meaning that it can be loaded without issue onto an unpatched server. However, if an unpatched session is directed to a server that has already been patched, the session may not load as it could be reliant upon classes not present in the patched sever.

In accordance with an embodiment, after MS3 receives the request to load the session from the traffic director 430, it can load the session and send a response 1302 to the traffic director 430. At this point, the cluster 500 may be going through a patching process, whereby MS1 and MS2 have already been patched (e.g., "patched servers 502"), and MS4 and MS5 are unpatched (e.g., "unpatched servers 506"). After sending the response 1302 to the traffic director, MS3 can be taken offline for patching 1310, and brought back online as MS3' (a patched version of MS3). In cases where a long running session, a next request for the session originally loaded on MS3 could instead be directed to the patched version of MS3, namely MS3'. In such a situation, the unpatched session may not be able loaded on MS3' as the session may not be able to find the classes, or the same versions of the classes, that it requires.

Session Handling—Shutdown of Last Unpatched Server Issues

In accordance with an embodiment, patching, such as zero downtime patching, can update each node in a rolling fashion where server1 is shutdown, patched, and then restarted before continuing with the next node. As the patching process come to the last server to be patched, there can exists a group of sessions originating on unpatched servers that may only be compatible on the last server. If the patching process shuts down the last server before these sessions are done (timeout or invalidation), then those sessions may not be loaded on any server and can be lost.

Session Handling—Server Shutdown and Session Replication

In accordance with an embodiment, as patching, such as ZDT patching, rolls through a cluster, the server being patched can be shutdown putting its primary sessions at risk. This is because when the patching process shuts down, for example, server1, server1's primary copy of sessions are no longer available. If server2 is hosting the secondary sessions they are elevated to primary status on server2, but the sessions are not necessarily replicated to any other server in the cluster until another request comes in to update the session. Shortly after restarting server1 the patching process may shutdown server2 as the next operation in the patching rollout. Any the client that does not send another request before server2 is shutdown can lose its session information.

Session Handling During Patching

In accordance with an embodiment, in order to handle session incompatibility with minimal impact to existing replication services, the patching framework can connect to each server and temporarily enable an existing option to deserialize the session lazily, cluster wide session querying, along with new options to replicate sessions on shutdown and cleanup orphaned secondaries after fetching them. These options can combine to ensure that a session can be stored appropriately across the cluster and minimize session loss during patching.

In order to avoid session loss, in accordance with an embodiment, it can be ensured that a server that is able to load the session serves the associated session request. The targeted server can attempted to load a requested session, and if it unable to do so, the server can communicate an appropriate list of servers to a traffic director using a response, such as a 503 response code, indicating which servers should be able to handle the session request.

Figure 14:
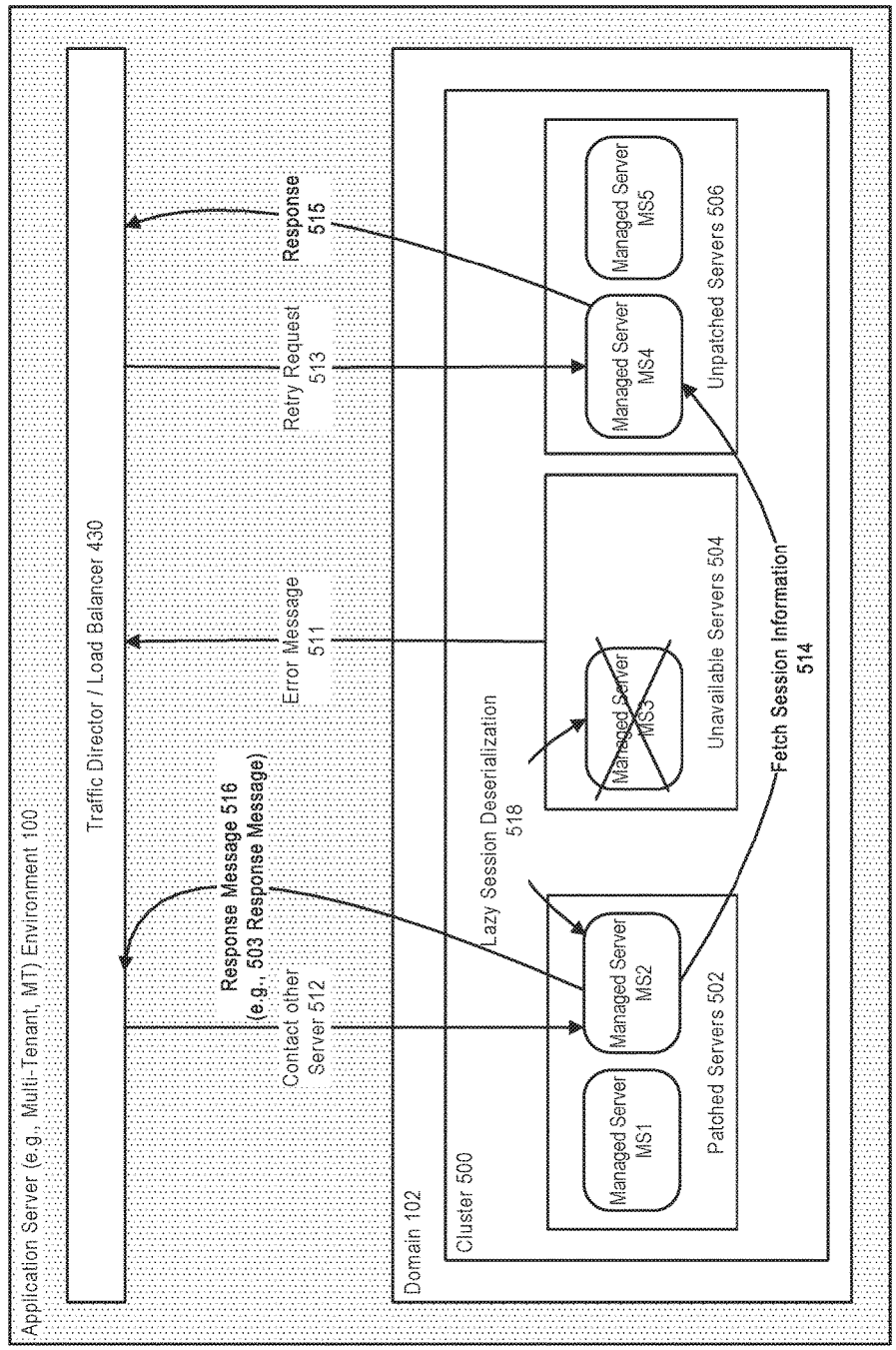
FIG. 14 illustrates a system for session handling, in accordance with an embodiment.

FIG. 14 illustrates a system for session handling, in accordance with an embodiment.

As illustrated in FIG. 14, in accordance with an embodiment and the example illustrated therein, a cluster 500 can include a plurality of managed servers (here indicated as MS1-MS5), provided in a plurality of groups including groups of patched servers 502, unavailable servers 504, and unpatched servers 506.

In accordance with an embodiment, when a session is requested to be loaded onto a primary managed server, and the primary managed server is unavailable (here indicated as MS3 being stricken-through indicating, for example, that MS3 has been taken offline for patching), then the traffic director (e.g., OTD) can receive an error message 511 indicative of MS3 being down. The traffic director can try 512 to contact a secondary managed server MS2, which upon detecting a deserialization error with the requested session can respond to the traffic director with a response message 516 (e.g., a 503 response message). The response message 516 can contain header information that indicates one or more managed servers that are capable of deserializing the requested session. For example, as depicted in FIG. 14, as the requested session was not able to be deserialized on patched MS2, the response message 516 can contain header information that informs the traffic director that MS4 and MS5 are able to load the requested session. The traffic director can retry 513 its request, based on the 503 header information, this time to managed server MS4. The application server at MS4 can then fetch appropriate session information 514 from MS2, and finally respond 515 to the request.

In accordance with an embodiment, the process can leverage the use of a lazy session deserialization 518 functionality. Lazy session deserialization is a performance based feature enabled on Exalogic platforms. Based on configuration, it is static in nature as the cluster members must be started with the same value in order to inter-operate correctly. The ReplicatedSessionData objects can query a ClusterMBean to check whether LazySessionDeserialization is enabled prior to deciding whether to deserialize session attributes. When enabled the session attributes can be stored effectively as a byte array. That byte array can be automatically deserialized later when the attribute is retrieved.

In order to take advantage of this capability to load the session only when necessary, in accordance with an embodiment, the functionality can be made dynamic. Support for interacting with servers with different configuration can be provided including the ability to properly handle failover cases where the stored byte array can be sent and received correctly. The system can additionally ensure that we detect previous server versions in order to correctly format and handle the replication communication.

Session Handling—Session Compatibility Detection

In accordance with an embodiment, a patching framework (e.g., ZDT patching framework) can provide notifications to members of a cluster about the current state of servers in the cluster. The framework can do so in the format of a pair of lists of servers. One list of server names will be considered a grouping, and the other list of server names will be considered the other group. There can again be two different points where notifications are necessary. The first notification can occur after shutting down a server and applying a patch. Prior to restarting that server the cluster can be notified with new groupings with the newly patched server joining the patched list. This can ensure the running servers do not have stale information as the patched server is restarted. The second notification can occur immediately after a server has been started, while the framework waits for all applications to become ready. The goal is to ensure the server gets notified of the state as soon as possible to ensure it can handle any requests involving session incompatibilities correctly. Finally, after the patching process is complete the values can be reset to null with a final notification to the cluster. This can restore the state before patching so the cluster will no longer assume that patching is under way so behavior can again return to the default.

In accordance with an embodiment, a web container can attempt to retrieve a replicated session. If there is a deserialization error that occurs, then the web container can check for the current server groups. The value of the current server groups can indicate whether patching is currently in progress. The web container can examine the contents of the groups to identify which group the current server is in. The group that does not contain the current server name can be considered the compatible group based on the logic that the current server is incompatible and thus the other group must be compatible. Once the web container has identified the group of servers where the session is most likely compatible, it can return a 503 response message with a header with a list (e.g., a X-WebLogic-Cluster-FailoverGroup-List) of servers in that group (i.e., the group of servers that the session is likely compatible with).

In accordance with an embodiment, the traffic director can receive the 503 response message along with the header containing the server group and will randomly select servers from that list to redirect the session request. The traffic director can handle servers in the drain pool as this is information that WLS does not have.

In accordance with an embodiment, the 503 response message from the web container can specify a list whose value would be a list of vertical bar separated server information.

In accordance with an embodiment, the server-specified list can contain the current members in the cluster generated at runtime. This can be handled by the front end. The list can be dynamic in nature and can change during runtime, however, the list can consist of all cluster members that are known at the start of the patching process.

In accordance with an embodiment, the server-specified list may contain entries that are placed in drain mode as WLS is not aware of this mode/state.

In accordance with an embodiment, the server-specified list does not contain entries that are not part of the failing-over origin's server pool in the traffic director's configuration as all entries will be servers that are cluster members.

In accordance with an embodiment, the traffic director should pick randomly from the list to maintain consistent failover/load-balancing behavior.

In accordance with an embodiment, the traffic director can log a warning for each offline entry found while walking the failover list.

In accordance with an embodiment, the server-specified list can be 'transient' and is not stored or 'remembered' in any form beyond the subsequent (to the 503) retry.

In accordance with an embodiment, the traffic director can have a configurable parameter that specifies how many times a request should be retried. This prevents a scenario where a 503 response is continuously sent.

Session Handling—Session Replication on Shutdown

In accordance with an embodiment, sessions (i.e., session data) can be preemptively propagated to another server in the cluster during graceful shutdown when necessary. For example, in a situation where ZDT rollout has shutdown the server holding a HTTP Session, and the next step is to shutdown the server holding the replica. In that such a situation, the system can detect during shutdown that the session will be lost as there is no backup copy within the cluster. Because of this, the system can ensure that the session can be replicated onto another server within the cluster.

Figure 15:
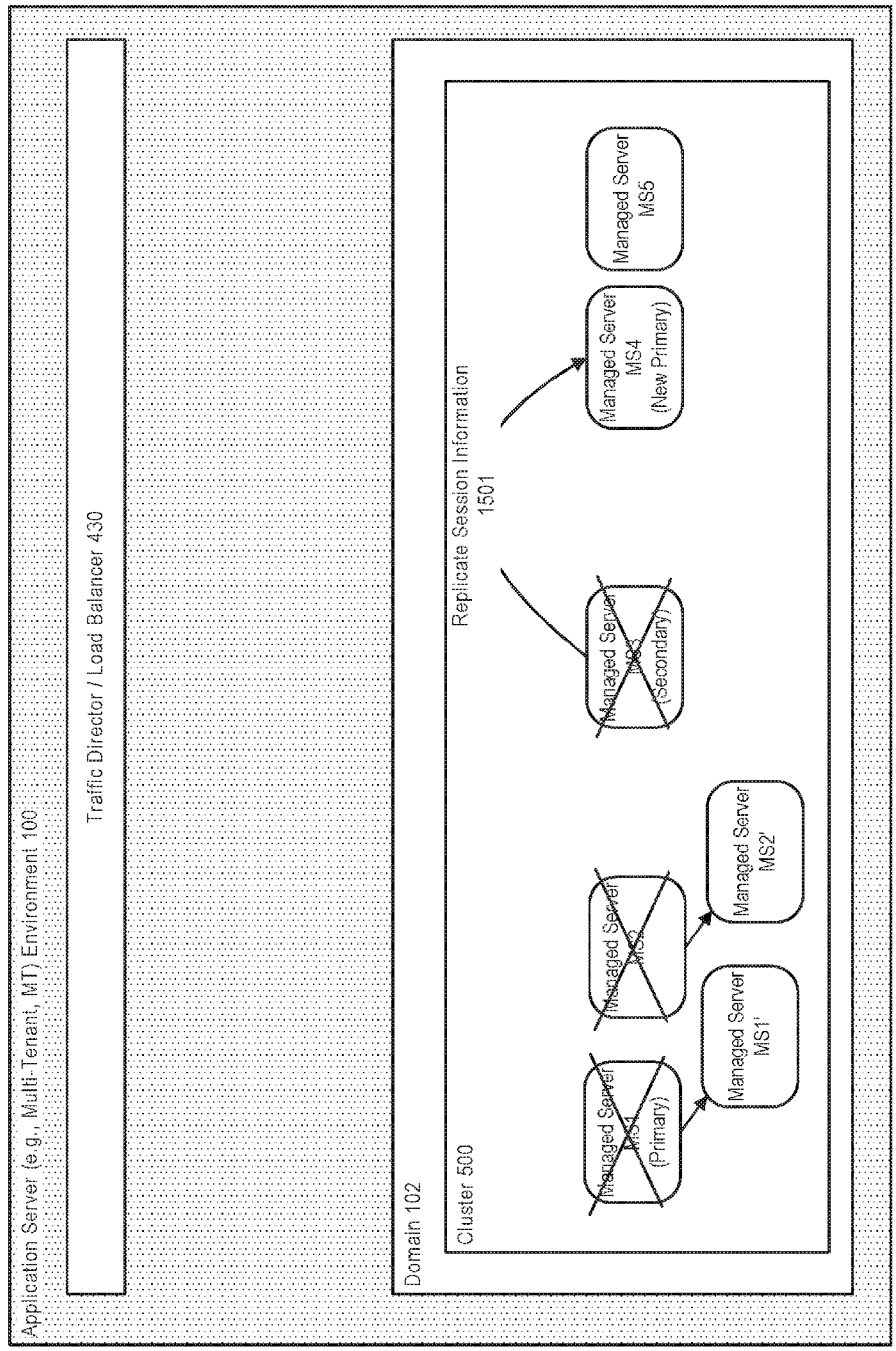
FIG. 15 illustrates a system for session handling, in accordance with an embodiment.

FIG. 15 illustrates a system for session handling, in accordance with an embodiment. More particularly, FIG. 15 illustrates a system for session replication on server shutdown.

As illustrated in FIG. 15, in accordance with an embodiment and the example illustrated therein, a cluster 500 can include a plurality of managed servers (here indicated as MS1-MS5), provided in a plurality of groups including groups of patched servers, unavailable servers, and unpatched servers.

In accordance with an embodiment, a server holding the primary copy of a session, which is MS1 in the depicted embodiment, can undergo patching and be restarted as MS1'. As well, during this time, the server holding the secondary copy of the session, MS3 in the depicted embodiment, can be taken offline for patching. In such a situation, the system can dictate that MS3 preemptively replicate any single session copies before shutting down. Thus there is always a copy available within the cluster. As shown in FIG. 15, this is MS3 replicating the session information 1501 into unpatched MS4.

In accordance with an embodiment, during server shutdown, immediately before notifying other cluster members of shutdown, a service, such as a replication service, can ensure that each primary copy of a session is replicated to a secondary server. This can ensure that no session is lost during the shutdown operation of a server. This can affect clients that have not made a request since an original primary has been restarted meaning the clients have not reestablished a new primary server with a new secondary server. Finally when such a client returns, the session will be available on some server in the cluster.

Figure 16:
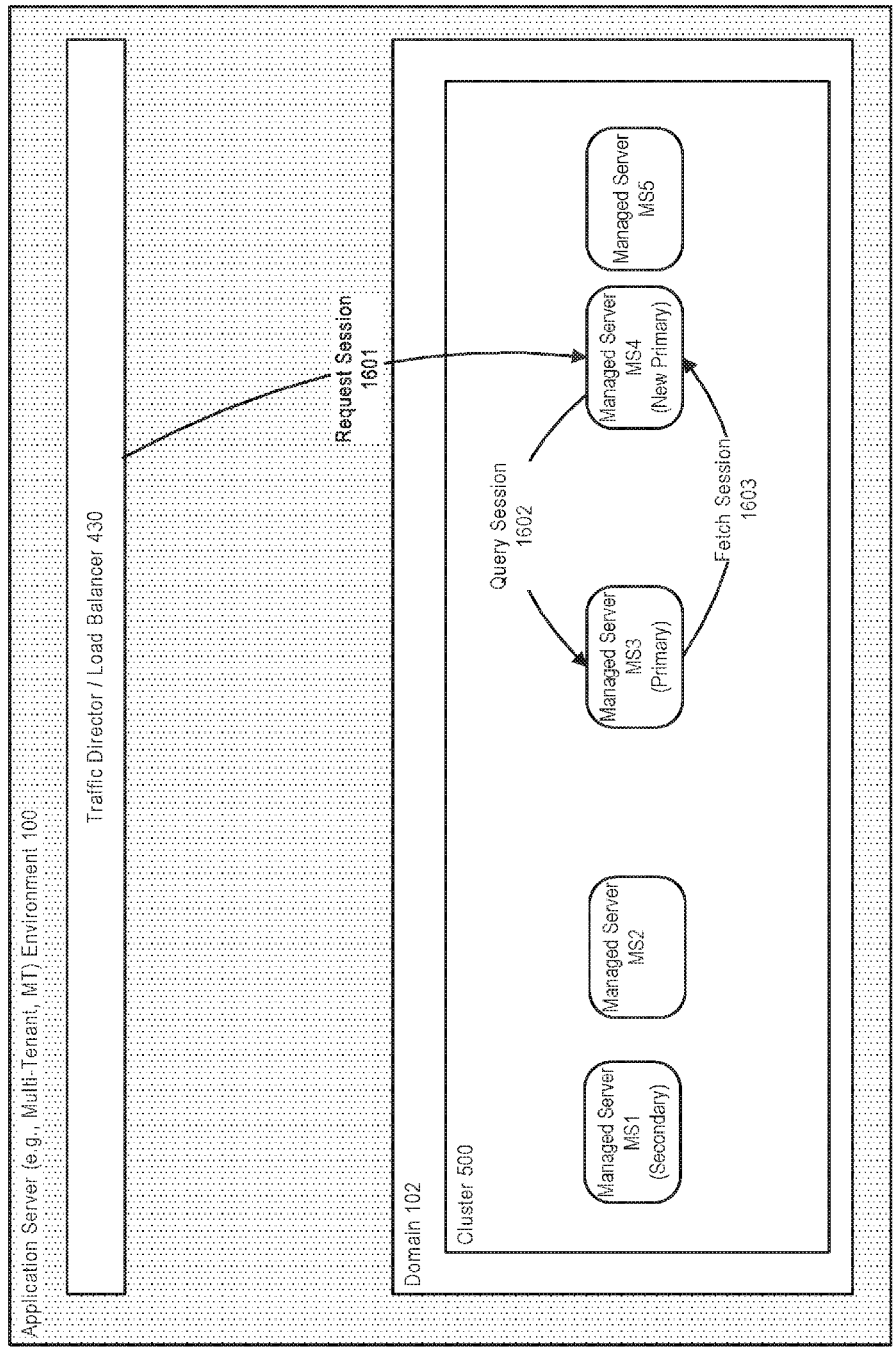
FIG. 16 illustrates a system for session handling, in accordance with an embodiment.

FIG. 16 illustrates a system for session handling, in accordance with an embodiment. More particularly, FIG. 16 illustrates a system for session fetching, in accordance with an embodiment.

In accordance in an embodiment, because the systems and methods described herein can rely on the association of an HTTP session with a primary server and a secondary server, it is not sufficient to simply have the session somewhere in the cluster. There is also a need to be able to find the session when the client request lands on an arbitrary server within the cluster. The systems described in FIG. 16 allows for the ability for servers to query other servers in the cluster for specific sessions if the querying servers don't have a copy.

In the embodiment depicted in FIG. 16, the system that an incoming request 1601 to a server without the session, MS4, can trigger a query 1602, and once the session is found within the cluster it can be fetched 1603 so that the request can be served on the server, MS4, which can be the new primary server.

In accordance with an embodiment, session fetching (also referred to as session query protocol), can work in conjunction with the above described session replication on server shutdown. After the system has automatically replicated a session to a secondary without updating the client cookie, a fail over request can land on any member of the cluster and the system will need some mechanism to find the session. The behavior when a request lands on a random sever can follow these steps. First, a check can be performed of the local maps for the session ROID, and can be used when found. Second, a check can be performed of the JVMIDs in a client cookie, and attempt to get the session from the primary or secondary server. When available, the session can be fetched from the server, and the querying server can then become the primary server. Third, if the is not available from the previous steps, then the system can return a new session if session fetching is not enabled. If session fetching is enabled, then the server can broadcast a query to the cluster. A first response can be used to get the session, and the querying server can become the primary.

Figure 17:
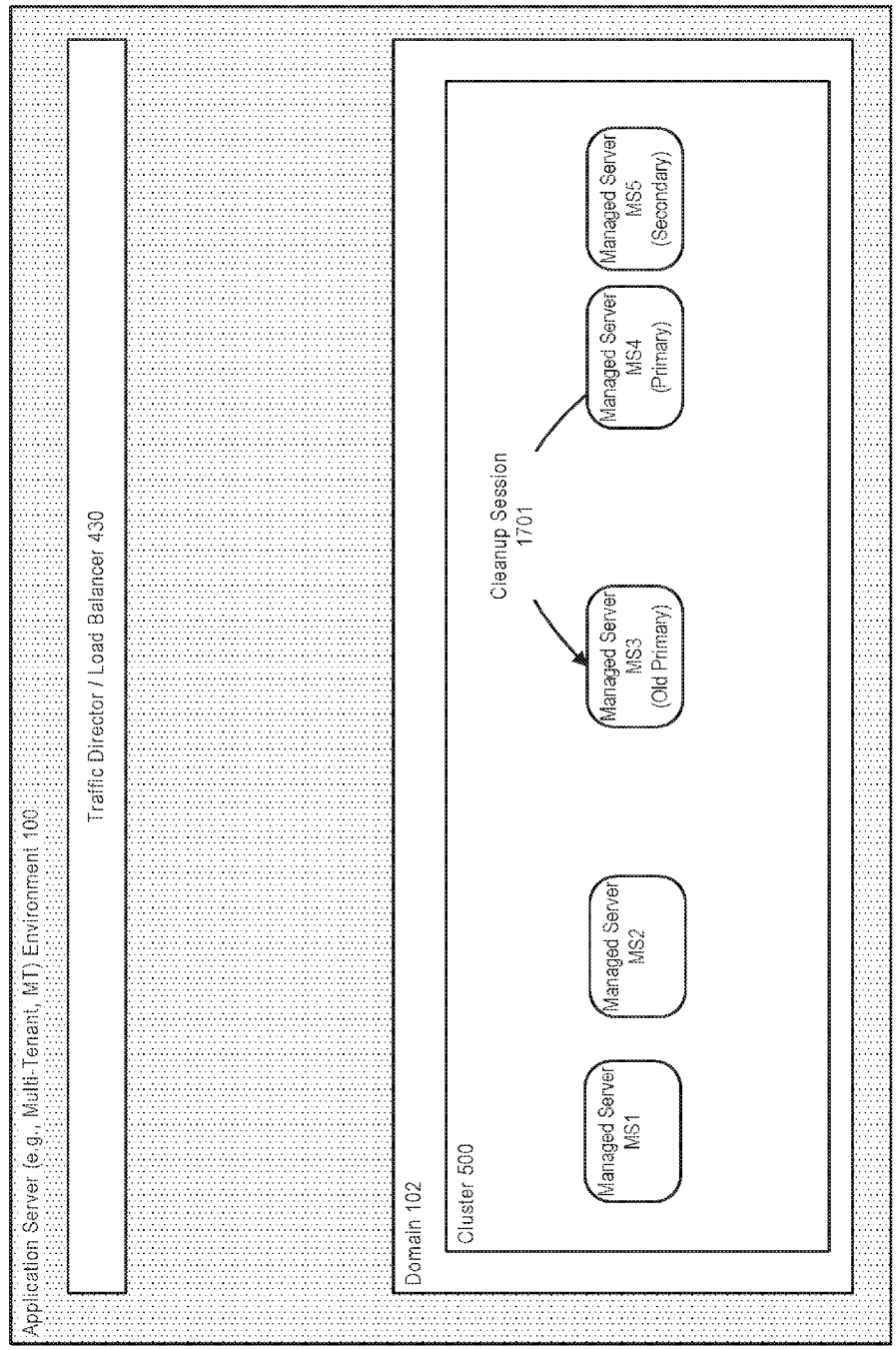
FIG. 17 illustrates a system for session handling, in accordance with an embodiment.

FIG. 17 illustrates a system for session handling, in accordance with an embodiment. More particularly, FIG. 17 illustrates a system for orphaned session cleanup, in accordance with an embodiment.

In accordance with an embodiment, the systems and methods described herein can take steps to cleanup instances that are fetched. Historically, WebLogic Server hasn't had to worry much about orphaned sessions. Traditionally, front end load balancers (e.g., OTD) and web servers have been required to honor the session's server affinity. And in the rare case that a request would land on a server that did not contain the primary or secondary, the session would be fetched from the primary server or secondary server and then the orphaned copy would be forgotten to be cleaned up upon timeout or other regular intervals. Because the pointer to the session changed, the actual stored reference would never be used again. However, the ZDT patching framework presents the scenarios where a session must be found within the cluster and fetched from the server that holds the session. Not only can the number of session instances proliferate—all with various versions of the same session—the cluster is now queried for the copy, and the query must not find any stale copies—only the current replica of the session.

As illustrated in FIG. 17, in accordance with an embodiment and the example illustrated therein, a cluster 500 can include a plurality of managed servers (here indicated as MS1-MS5). As depicted, after MS4 has fetched the session data to serve an incoming request for a session, it can launch a cleanup request to MS3 to ensure that no stale data is left within the cluster 500.

In accordance with an embodiment, in order to deal with the probability of serving stale session data from an orphaned secondary, a mechanism can cleanup orphaned secondary copies after fetching. When this functionality is enabled during patching, the replication service can trigger a background process that handles the cleanup of orphaned sessions after fetching that session. The background process can determine the session version number, timestamp information, where the session was found, any other servers that session may have been associated with, and the new secondary server. This will allow the system to clean up all stale copies based on the version and timestamp information without removing the current copies of the session. The cleanup can be careful to ensure the session is only removed if it remains stale. If the copy suddenly becomes non-stale, then a conditional remove can detect this and not perform the remove.

For example, referring to FIG. 17, MS3 can be an original primary server that is shut down for patching, with MS2 being the secondary. A request for the session can land on MS4, which can retrieve a copy of the session from MS2, and replicate to new secondary MS5. MS5 can then launch a background thread to contact MS2 to remove the stale session. The background thread can determine not to remove the session from MS5, the new secondary. The background thread can additionally determine if the session on MS2 was linked to any other server as a primary/secondary and can remove the session. If, then, a subsequent request lands on MS4, and MS4 is shot down, the request can land on MS2, where there is no stale copy of the session. Instead, MS2 can fetch a current version of the session form MS5.

Session Handling—Wait for all Sessions

In accordance with an embodiment, when server is gracefully shutdown, a client may specify ignoreSessions=false to make web container wait for completion of sessions which are not replicated. For ZDT patching, if the session is incompatible and the server is last unpatched server in the cluster, the server will be the only one which has compatible sessions and it must wait for all sessions to be completed.

Figure 18:
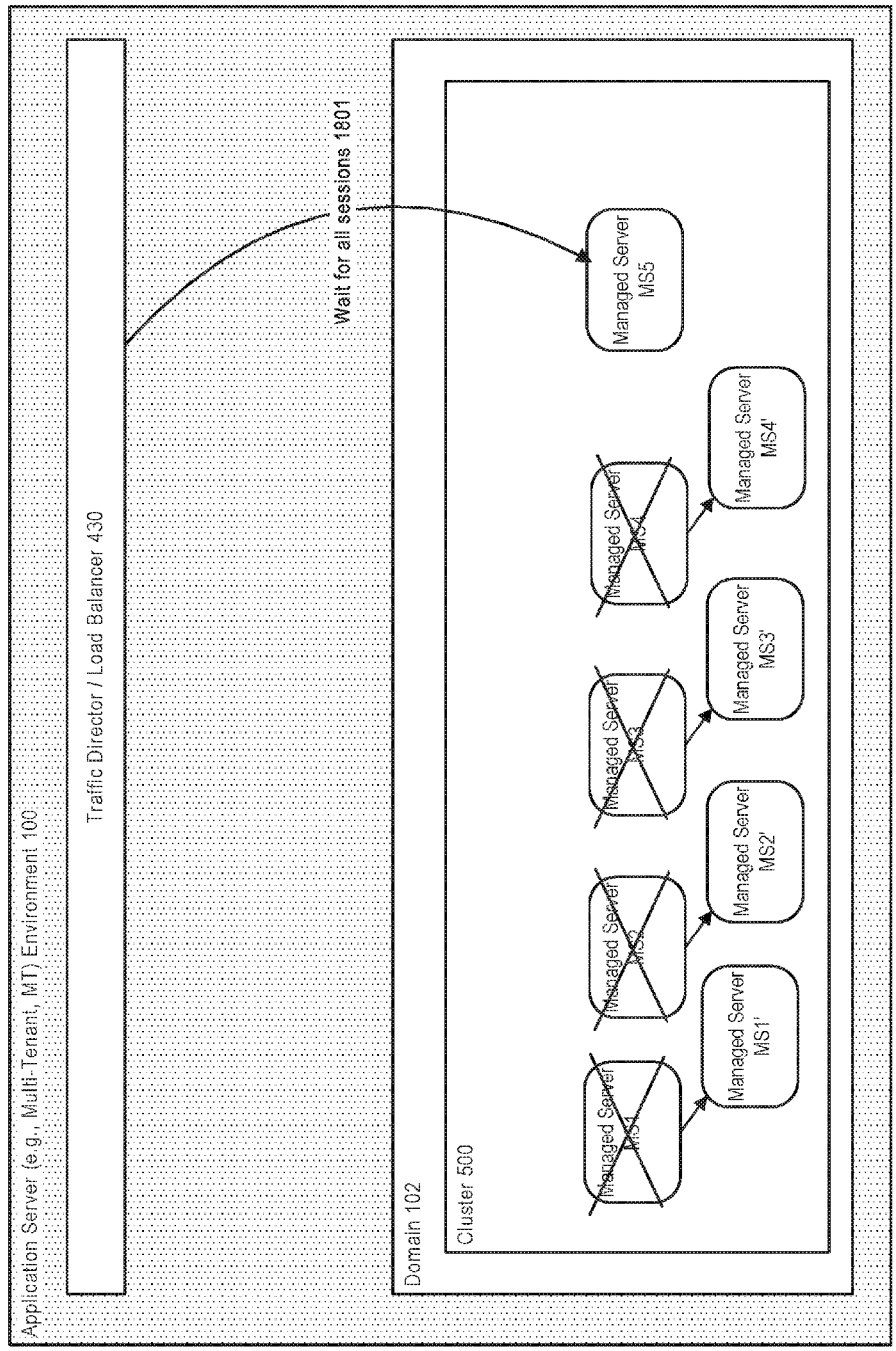
FIG. 18 illustrates a system for session handling, in accordance with an embodiment.

FIG. 18 illustrates a system for session handling, in accordance with an embodiment. More particularly, FIG. 18 illustrates a system session handling and waiting for all sessions to complete, in accordance with an embodiment.

As illustrated in FIG. 18, in accordance with an embodiment and the example illustrated therein, a cluster 500 can include a plurality of managed servers (here indicated as MS1-MS5). As depicted, each managed server MS1-MS4 has been shutdown and subsequently patched, resulting in MS1'-MS4', leaving MS5 the last remaining unpatched server. Because of this, a wait for all sessions flag 1801 can be imposed on MS5, which would allow all open sessions compatible with the unpatched MS5 (i.e., those sessions that are likewise unpatched) to complete before MS5 is shut down for patching.

In accordance with an embodiment, the wait for all sessions flag can signal to the web container to wait for all sessions to be invalidated/completed prior to finishing the shutdown sequence. All requests without associated session can be rejected by 503 response, OTD will try other servers in the cluster to serve these requests if it get 503 response. All requests with existing sessions can be properly served. The web container must handle each of these sessions until completion as they may be incompatible on any of the patched servers.

Figure 19:
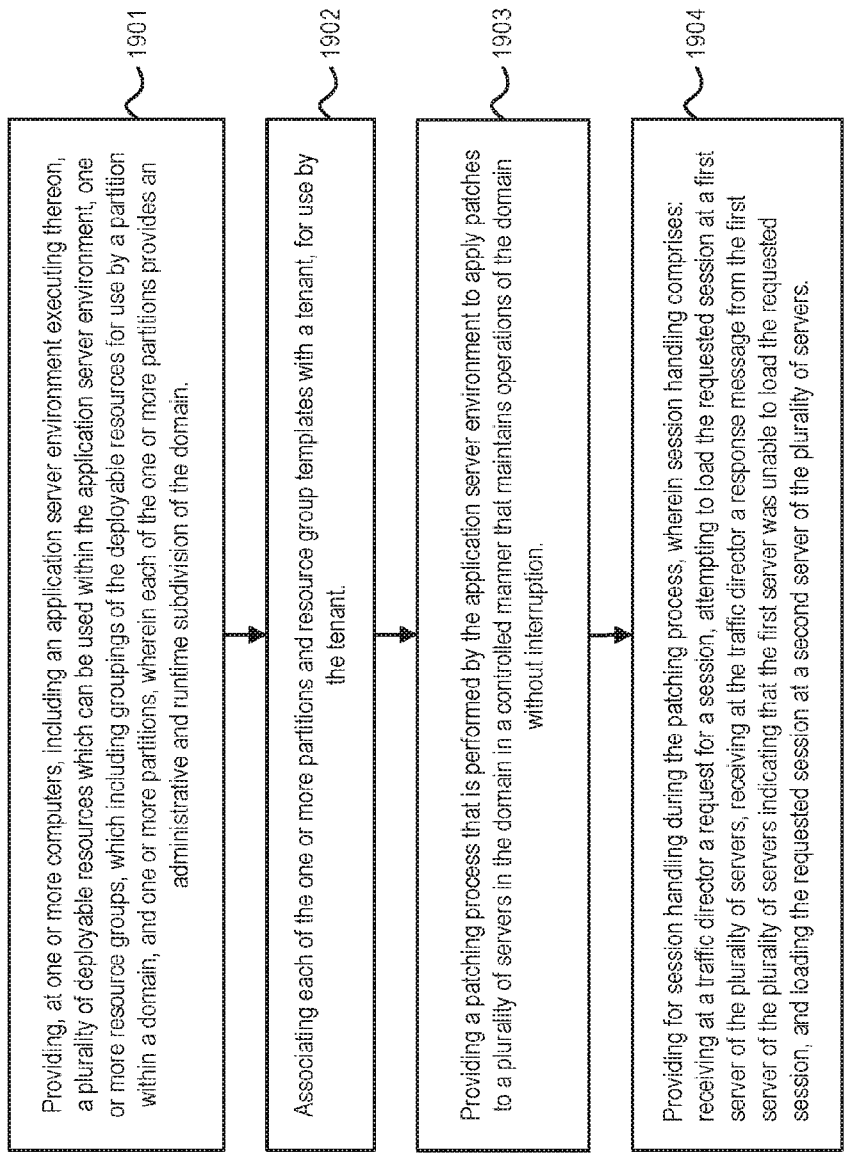
FIG. 19 illustrates a flowchart of a method for session handling, in accordance with an embodiment.

FIG. 19 illustrates a flowchart of a method for session handling, in accordance with an embodiment.

As illustrated in FIG. 19, at step 1901, the method can begin with providing, at one or more computers, including an application server environment executing thereon, a plurality of deployable resources which can be used within the application server environment, one or more resource groups, which including groupings of the deployable resources for use by a partition within a domain, and one or more partitions, wherein each of the one or more partitions provides an administrative and runtime subdivision of the domain.

At step 1902, the method can associate each of the one or more partitions and resource group templates with a tenant, for use by the tenant At step 1903, the method can provide a patching process that is performed by the application server environment to apply patches to a plurality of servers in the domain in a controlled manner that maintains operations of the domain without interruption.

At step 1904, the method can provide for session handling during the patching process, wherein session handling comprises: receiving at a traffic director a request for a session, attempting to load the requested session at a first server of the plurality of servers, receiving at the traffic director a response message from the first server of the plurality of servers indicating that the first server was unable to load the requested session, and loading the requested session at a second server of the plurality of servers.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for session handling in a multitenant application server environment, comprising:
   one or more computers, including an application server environment executing thereon, together with:
      a plurality of deployable resources which can be used within the application server environment,
      one or more resource groups, which including groupings of the deployable resources for use by a partition within a domain, and
      one or more partitions, wherein each of the one or more partitions provides an administrative and runtime subdivision of the domain, and wherein the system can associate the one or more partitions and the one or more resource groups with a tenant, for use by the tenant; and
   wherein the system uses a patching process that is performed by the application server environment to apply patches to a plurality of servers in the domain in a controlled manner that maintains operations of the domain without interruption; and
   wherein the system provides for session handling during the patching process, wherein session handling comprises:
      receiving at a traffic director a request for a session, the session being associated with a first version of a server patch, the first version of the server being capable of deserializing the requested session,
      attempting to load the requested session at a first server of the plurality of servers, the first server comprising a patched version of the first version of the server patch, the patched version of the first version of the server being incapable of deserializing the requested session,
      receiving, at the traffic director, a response message from the first server of the plurality of servers indicating that the first server is unable to deserialize the requested session, the response message comprising a list of one or more servers of the plurality of servers comprising the first version of the server patch, the list including a second server of the plurality of servers, and
      loading the requested session at the second server of the plurality of servers.

2. The system of claim 1, wherein the patching process comprises:
   applying a patch to create a patched home directory; and
   performing a rollout of the patched home directory to the plurality of servers in the domain that are to be patched, including for each server of the plurality of servers in the domain to be patched:
   shutting down the server,
   updating the server to point to an instance of the patched home directory, and
   starting the server.

3. The system of claim 1, wherein the list of one or more servers is contained in a header of the response message.

4. The system of claim 3, wherein the traffic director randomly selects the second server of the plurality of servers from the list of servers capable of loading the requested session.

5. The system of claim 1, wherein attempting to load the requested session at the first server of the plurality of servers comprises:
   storing attributes of the requested session as a byte array; and
   performing a check to determine whether the first server of the plurality of servers can load the requested session.

6. The system of claim 1, wherein the first server of the plurality of servers is a patched server, and wherein the second server of the plurality of servers is an unpatched server, and wherein the requested session is an unpatched session.

7. The system of claim 1, wherein the application server environment includes a Java EE application server, and wherein each resource group includes one or more related applications together with resources upon which those applications depend, and wherein the system is provided within a cloud environment, to support multiple tenants operating within the cloud environment.

8. A method for session handling in a multitenant application server environment, comprising:
   providing, at one or more computers, including an application server environment executing thereon,
      a plurality of deployable resources which can be used within the application server environment,
      one or more resource groups, which including groupings of the deployable resources for use by a partition within a domain, and
      one or more partitions, wherein each of the one or more partitions provides an administrative and runtime subdivision of the domain,
   associating each of the one or more partitions and resource groups with a tenant, for use by the tenant;
   providing a patching process that is performed by the application server environment to apply patches to a plurality of servers in the domain in a controlled manner that maintains operations of the domain without interruption; and
   providing for session handling during the patching process, wherein session handling comprises:
      receiving at a traffic director a request for a session, the session being associated with a first version of a server patch, the first version of the server being capable of deserializing the requested session, attempting to load the requested session at a first server of the plurality of servers, the first server comprising a patched version of the first version of the server patch, the patched version of the first version of the server being incapable of deserializing the requested session, receiving, at the traffic director, a response message from the first server of the plurality of servers indicating that the first server is unable to deserialize the requested session, the response message comprising a list of one or more servers of the plurality of servers comprising the first version of the server patch, the list including a second server of the plurality of servers, and loading the requested session at the second server of the plurality of servers.

9. The method of claim 8, wherein the patching process comprises:

applying a patch to create a patched home directory; and performing a rollout of the patched home directory to the plurality of servers in the domain that are to be patched, including for each server of the plurality of servers in the domain to be patched:

shutting down the server, updating the server to point to an instance of the patched home directory, and starting the server.

10. The method of claim 8, wherein the list of one or more servers is contained in a header of the response message.

11. The method of claim 10, wherein the traffic director randomly selects the second server of the plurality of servers from the list of servers capable of loading the requested session.

12. The method of claim 8, wherein attempting to load the requested session at the first server of the plurality of servers comprises:

storing attributes of the requested session as a byte array; and performing a check to determine whether the first server of the plurality of servers can load the requested session.

13. The method of claim 8, wherein the first server of the plurality of servers is a patched server, and wherein the second server of the plurality of servers is an unpatched server, and wherein the requested session is an unpatched session.

14. The method of claim 8, wherein the application server environment comprises a Java EE application server, and wherein each resource group includes one or more related applications together with resources upon which those applications depend, and wherein the method is performed in a cloud environment, to support multiple tenants operating within the cloud environment.

15. A non-transitory computer readable storage medium, including instructions stored thereon for session handling in a multitenant application server environment which when read and executed by one or more computers cause the one or more computers to perform the steps comprising:

providing, at one or more computers, including an application server environment executing thereon, a plurality of deployable resources which can be used within the application server environment, one or more resource groups, which including groupings of the deployable resources for use by a partition within a domain, and one or more partitions, wherein each of the one or more partitions provides an administrative and runtime subdivision of the domain, associating each of the one or more partitions and resource groups with a tenant, for use by the tenant;

providing a patching process that is performed by the application server environment to apply patches to a plurality of servers in the domain in a controlled manner that maintains operations of the domain without interruption; and providing for session handling during the patching process, wherein session handling comprises:

receiving at a traffic director a request for a session, the session being associated with a first version of a server patch, the first version of the server being capable of deserializing the requested session, attempting to load the requested session at a first server of the plurality of servers, the first server comprising a patched version of the first version of the server patch, the patched version of the first version of the server being incapable of deserializing the requested session, receiving, at the traffic director, a response message from the first server of the plurality of servers indicating that the first server is unable to deserialize the requested session, the response message comprising a list of one or more servers of the plurality of servers comprising the first version of the server patch, the list including a second server of the plurality of servers, and loading the requested session at the second server of the plurality of servers.

16. The non-transitory computer readable storage medium of claim 15, wherein the patching process comprises:

applying a patch to create a patched home directory; and performing a rollout of the patched home directory to the plurality of servers in the domain that are to be patched, including for each server of the plurality of servers in the domain to be patched:

shutting down the server, updating the server to point to an instance of the patched home directory, and starting the server.

17. The non-transitory computer readable storage medium of claim 15, wherein the list of one or more servers is contained in a header of the response message.

18. The non-transitory computer readable storage medium of claim 17, wherein the traffic director randomly selects the second server of the plurality of servers from the list of servers capable of loading the requested session.

19. The non-transitory computer readable storage medium of claim 15, wherein attempting to load the requested session at the first server of the plurality of servers comprises:

storing attributes of the requested session as a byte array; and performing a check to determine whether the first server of the plurality of servers can load the requested session.

20. The non-transitory computer readable storage medium of claim 15, wherein the first server of the plurality of servers is a patched server, and wherein the second server of the plurality of servers is an unpatched server, and wherein the requested session is an unpatched session.

* * * * *

UNITED STATES PATENT AND TRADEMARK OFFICE
CERTIFICATE OF CORRECTION

PATENT NO. : 10,178,184 B2
APPLICATION NO. : 15/204351
DATED : January 8, 2019
INVENTOR(S) : Dorr et al.

Page 1 of 1

It is certified that error appears in the above-identified patent and that said Letters Patent is hereby corrected as shown below:

On the Title Page

Column 2, under Abstract, Line 13, delete "severs" and insert -- servers --, therefor.

In the Specification

In Column 1, Line 60, delete "severs" and insert -- servers --, therefor.

In Column 13, Line 7, delete "session" and insert -- session. --, therefor.

In Column 14, Line 10, delete "severs" and insert -- servers --, therefor.

In Column 14, Line 23, delete "sever." and insert -- server. --, therefor.

In Column 14, Line 51, delete "severs" and insert -- servers --, therefor.

In Column 14, Line 64, delete "sever." and insert -- server. --, therefor.

In Column 18, Line 59, delete "sever" and insert -- server --, therefor.

In Column 20, Line 47, delete "tenant" and insert -- tenant. --, therefor.

Signed and Sealed this
Seventh Day of January, 2020

Andrei Iancu
*Director of the United States Patent and Trademark Office*